(12) United States Patent
Komamiya et al.

(10) Patent No.: US 12,346,633 B2
(45) Date of Patent: Jul. 1, 2025

(54) IMAGE FORMING APPARATUS AND INPUT DEVICE

(71) Applicant: Toshiba Tec Kabushiki Kaisha, Tokyo (JP)

(72) Inventors: Yuko Komamiya, Tokyo (JP); Kazuki Sato, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/173,011

(22) Filed: Feb. 22, 2023

(65) Prior Publication Data
US 2023/0350638 A1 Nov. 2, 2023

(30) Foreign Application Priority Data

May 2, 2022 (JP) ................................. 2022-076147

(51) Int. Cl.
*G06F 3/16* (2006.01)
*G06F 3/0488* (2022.01)
*H04N 1/00* (2006.01)

(52) U.S. Cl.
CPC ............ *G06F 3/167* (2013.01); *G06F 3/0488* (2013.01); *H04N 1/00411* (2013.01); *H04N 1/00427* (2013.01); *H04N 1/00482* (2013.01)

(58) Field of Classification Search
CPC .............................. G06F 3/0488; G06F 3/167
USPC ........................................................ 715/727
See application file for complete search history.

(56) References Cited

U.S. PATENT DOCUMENTS

| | | | |
|---|---|---|---|
| 8,683,369 B2* | 3/2014 | Yoshida | H04N 1/00474 715/772 |
| 9,285,987 B2* | 3/2016 | Mori | G06F 3/0483 |
| 10,942,623 B2* | 3/2021 | Kaneshiro | G06F 3/04817 |
| 11,036,441 B1* | 6/2021 | Kodimer | G06F 3/1253 |
| 11,899,991 B2* | 2/2024 | Yabusaki | G10L 15/22 |
| 2001/0004424 A1* | 6/2001 | Mutoh | G03G 15/502 399/81 |

(Continued)

FOREIGN PATENT DOCUMENTS

| | | |
|---|---|---|
| EP | 3291115 A1 | 3/2018 |
| JP | 2015090523 A | 5/2015 |

OTHER PUBLICATIONS

Extended European Search Report dated Oct. 2, 2023, mailed in counterpart European Application No. 23160063.6, 9 pages.

*Primary Examiner* — Reza Nabi
(74) *Attorney, Agent, or Firm* — Kim & Stewart LLP

(57) ABSTRACT

An image forming apparatus includes a controller that displays a first screen on a touch screen. The screen has selectable regions including a first display area and a second display area. The first display area is in a selected state when the first screen is initially displayed. The controller outputs audio data indicating the first display area is in the selected state. The controller receives a first user operation on the touch screen displaying the first screen to change the second display area to the selected display state and then outputs audio data indicating the second display area is in the selected state. The controller receives a second user operation on the touch screen displaying the first screen with the second display area in the selected display state to change a setting value associated with the second display area, and then outputs audio data indicating the setting value.

19 Claims, 15 Drawing Sheets

(56) References Cited

U.S. PATENT DOCUMENTS

| | | | | |
|---|---|---|---|---|
| 2007/0212098 A1* | 9/2007 | Hoshino | ............ | G03G 15/5016 |
| | | | | 399/81 |
| 2008/0174570 A1* | 7/2008 | Jobs | ................ | H04M 1/72436 |
| | | | | 345/173 |
| 2009/0262379 A1* | 10/2009 | Miyake | ............... | G03G 15/502 |
| | | | | 358/1.13 |
| 2010/0277762 A1* | 11/2010 | Eguchi | ............... | H04N 1/00323 |
| | | | | 358/1.15 |
| 2012/0013928 A1* | 1/2012 | Yoshida | ............... | G03G 15/502 |
| | | | | 358/1.13 |
| 2014/0359435 A1* | 12/2014 | Zheng | ................... | G06F 3/016 |
| | | | | 715/702 |
| 2015/0146255 A1* | 5/2015 | Shintani | ............. | H04N 1/00413 |
| | | | | 358/1.15 |
| 2018/0285028 A1* | 10/2018 | Yamada | ............. | H04N 1/00411 |
| 2018/0292907 A1* | 10/2018 | Katz | ...................... | G06F 3/017 |
| 2019/0096106 A1* | 3/2019 | Shapiro | ............. | G02B 27/0172 |
| 2019/0166267 A1 | 5/2019 | Minamide | | |
| 2019/0182371 A1* | 6/2019 | Ashall | ............... | H04M 1/72469 |
| 2019/0341027 A1* | 11/2019 | Vescovi | .................. | G10L 15/22 |
| 2021/0218853 A1* | 7/2021 | Saeda | ............... | H04N 1/00424 |
| 2021/0223864 A1* | 7/2021 | Forsland | ................. | G06F 1/163 |
| 2021/0342785 A1* | 11/2021 | Mann | ................... | G06F 40/186 |
| 2022/0035492 A1* | 2/2022 | Uchida | ..................... | G06F 3/123 |
| 2023/0370551 A1* | 11/2023 | Matsuda | ............ | H04N 1/00074 |
| 2024/0184989 A1* | 6/2024 | Mann | .................... | G06F 40/166 |
| 2024/0338151 A1* | 10/2024 | Narita | ................... | G06F 3/1229 |
| 2024/0377922 A1* | 11/2024 | Rajam | ................ | G06F 3/0482 |
| 2025/0028488 A1* | 1/2025 | Narita | ................... | G06F 3/1253 |

* cited by examiner

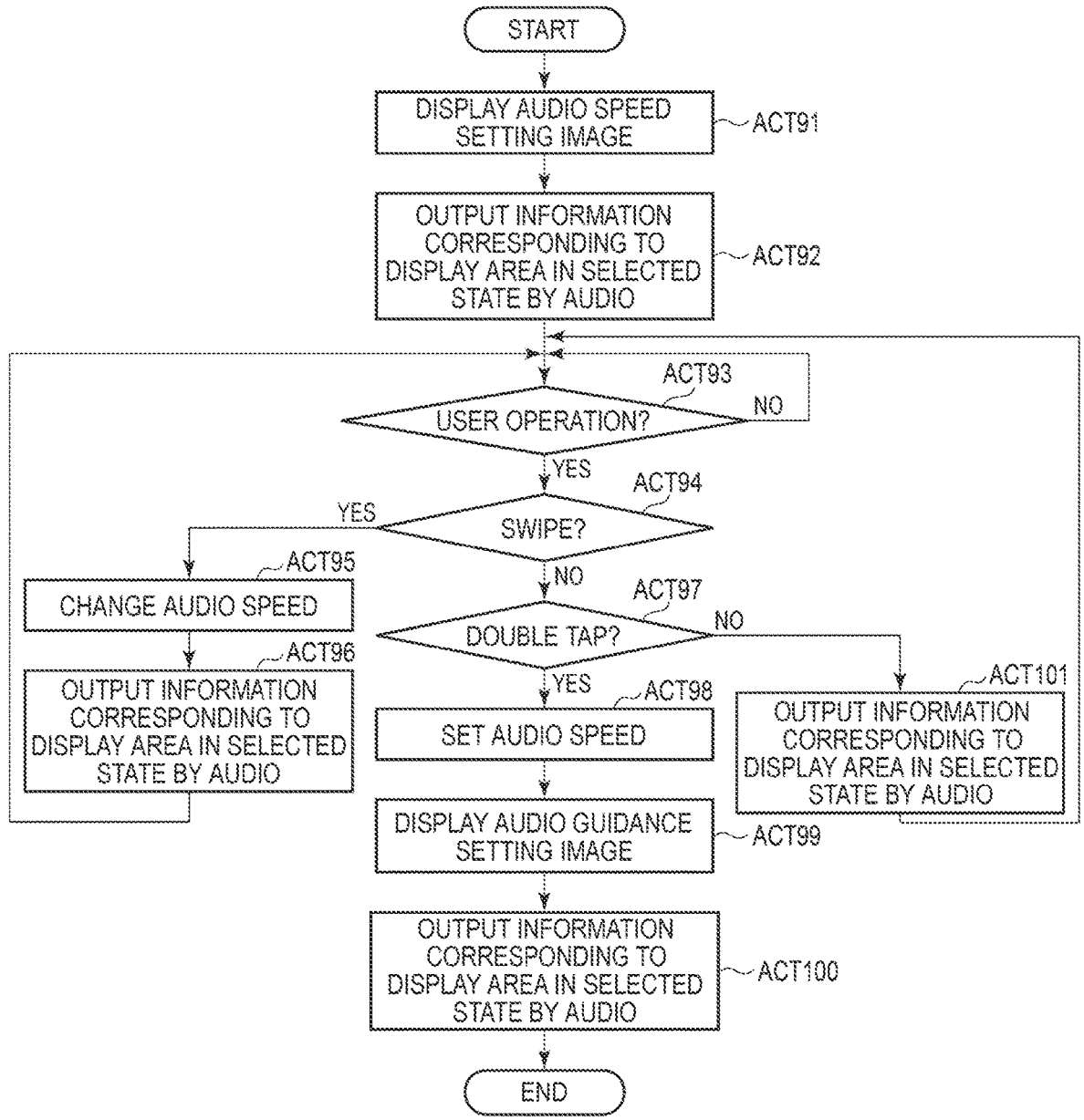

IMAGE FORMING APPARATUS AND INPUT DEVICE

CROSS-REFERENCE TO RELATED APPLICATION

This application is based upon and claims the benefit of priority from Japanese Patent Application No. 2022-076147, filed May 2, 2022, the entire contents of which are incorporated herein by reference.

FIELD

Embodiments described herein relate generally to an image forming apparatus and an input device.

BACKGROUND

Research is underway to incorporate a user interface for visually impaired users into various devices. For example, some multifunction peripherals (MPFs) have a user interface that outputs audio guidance and then recognizes the user's voice (speech) as input for interacting with the user interface.

However, such a user must operate the MFP by speaking (voice commands) to the MFP in an office environment which may at times be otherwise quiet. Therefore, some users may hesitate to use the MFP, and such a user interface may not be user-friendly though intended as such.

BRIEF DESCRIPTION OF THE DRAWINGS

FIG. 15 is a flowchart showing an example of processing associated with a user operation on an audio speed setting image displayed on the touch screen.

DETAILED DESCRIPTION

Embodiments provide a technology that enables screen-based operations for those with visual impairments and the like.

In general, according to one embodiment, ab image forming apparatus includes a controller configured to display a first screen on a touch screen display. The first screen has a plurality of selectable regions including a first display area and a second display area. The first display area is in a selected state when the first screen is initially displayed. The controller is configured to output audio data indicating the first display area is in the selected state. The controller is configured to receive a first user operation on the touch screen display displaying the first screen to change the second display area to the selected display state, and then output audio data indicating the second display area is in the selected state. The controller is configured to receive a second user operation on the touch screen display displaying the first screen with the second display area in the selected display state to change a setting value associated with the second display area, and then output audio data indicating the setting value associated with the second display area.

Configuration Example

Hereinafter, certain example embodiments will be described with reference to the drawings.

Figure 1:
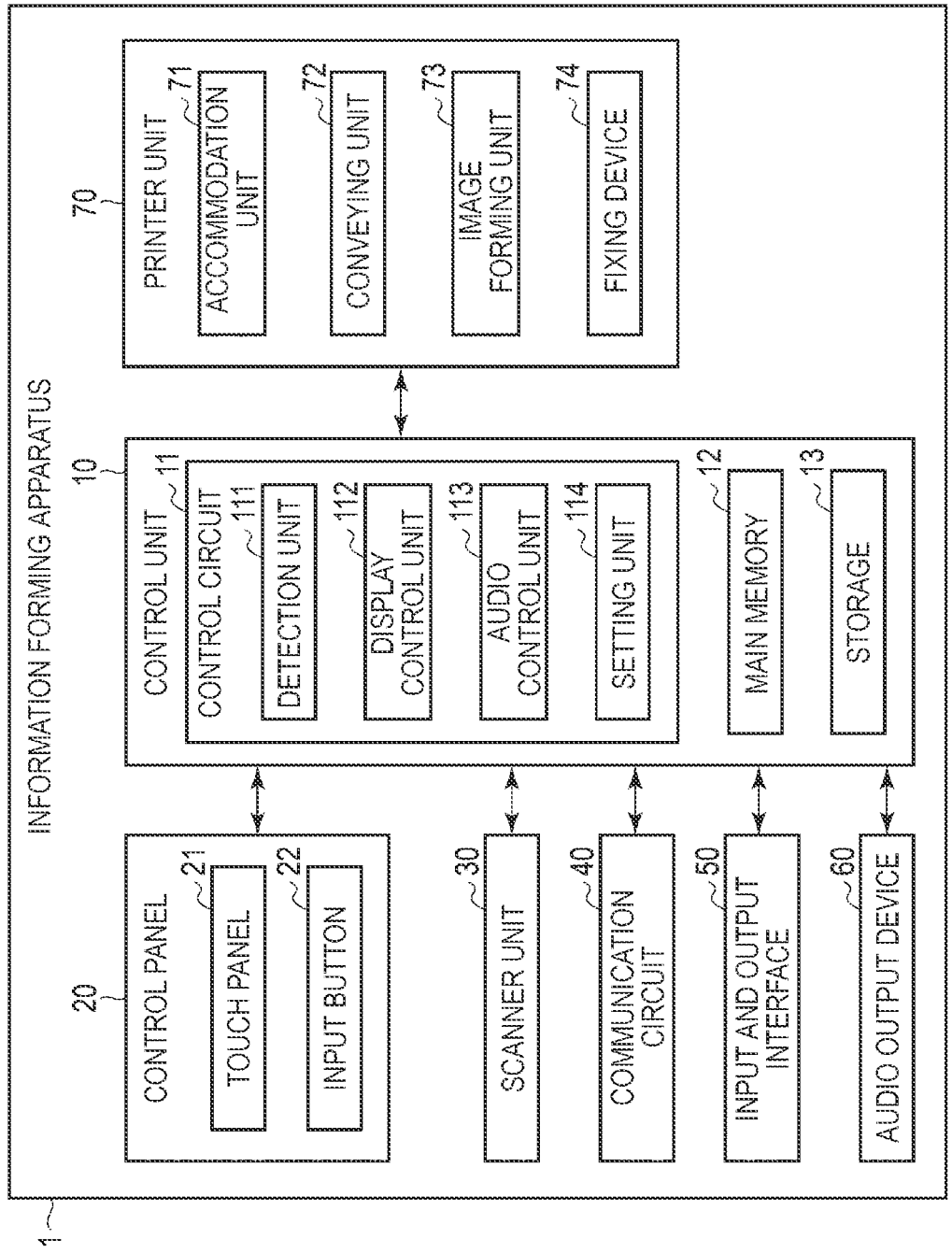
FIG. 1 is a block diagram of an image forming apparatus according to an embodiment.

FIG. 1 is a block diagram of an image forming apparatus 1 according to an embodiment.

The image forming apparatus 1 is an electronic device having an electrophotographic printing function. The image forming apparatus 1 will be described as an MFP having a copy function, a print function, a facsimile function, a scanner function, and the like.

The image forming apparatus 1 includes a control unit 10, a control panel 20, a scanner unit 30, a communication circuit 40, an input and output interface 50, an audio output device 60, and a printer unit 70.

The control unit 10 controls each unit of the image forming apparatus 1. The control unit 10 includes a control circuit 11, a main memory 12, and a storage 13.

The control circuit 11 corresponds to the central part of the image forming apparatus 1. The control circuit 11 may be or incorporate a processor such as a CPU (Central Processing Unit). The control circuit 11 may be or include an ASIC (Application Specific Integrated Circuit), an FPGA (Field Programmable Gate Array), or a GPU (Graphics Processing Unit) in addition to or instead of the CPU. The control circuit 11 loads a program pre-stored from the main memory 12 or the storage 13 into the main memory 12. The control circuit 11 executes various processes by executing the programs loaded into the main memory 12. The program is a program for implementing described functions of the control circuit 11.

The main memory 12 includes a non-volatile memory area and a volatile memory area. The main memory 12 stores an operating system and/or programs in the non-volatile memory area. The main memory 12 uses the volatile memory area as a work area in which data can be appropriately rewritten by the control circuit 11. For example, the main memory 12 includes a ROM (Read Only Memory) as a non-volatile memory area. For example, the main memory 12 includes a RAM (Random Access Memory) as a volatile memory area.

The storage 13 may be or include an HDD (Hard Disk Drive). The storage 13 may be or include a semiconductor storage medium such as an SSD (Solid State Drive) in addition to or instead of the HDD. The storage 13 stores programs, data used by the control circuit 11 to perform various processes, and data generated by the process of the control circuit 11. The storage 13 is an example of a storage device.

The control panel 20 includes a touch screen 21 and an input button 22.

The touch screen 21 is a device that can display images and receive instructions (e.g., user selections) based on user operations on the touch screen 21. The touch screen 21 includes a display device capable of displaying images. The display device can be a liquid crystal display, an organic EL (electroluminescence) display, or the like, but is not limited thereto. The touch screen 21 includes an input device stacked on the display device and is capable of receiving user input operations made on the touch screen 21. A user input operation ("user operation") on the touch screen 21 involves the user contacting (e.g., touching, tapping, pressing, etc.) the touch screen 21. The touch screen 21 is also called a touch panel.

The input button 22 can be a physical button that can be pressed, such as a print start button. The input button 22 is an interface through which an instruction can be input based on a user manipulation of the input button 22. In some instances, the input button may be a softkey button (that is, an image displayed on the touch panel 21).

The scanner unit 30 is a device that reads images such as text characters, figures, and photographs on a sheet placed at a predetermined position. The scanner unit 30 includes a line sensor. The line sensor may be of a CCD (Charge Coupled Device) type. The line sensor may be of a CIS (Contact Image Sensor) type. The scanner unit 30 generates image data based on the image read using the line sensor. The scanner unit 30 transmits the generated image data to the control unit 10. The control unit 10 stores the received image data in the storage 13 and transmits the data to the printer unit 70.

The communication circuit 40 is an interface for communicably connecting the image forming apparatus 1 to a user terminal via a wired or wireless network. For example, the user terminal is a PC (Personal Computer) or the like but is not limited thereto.

The input and output interface 50 is an interface for connecting the image forming apparatus 1 and an external device. The input and output interface 50 includes a wired cable connector. For example, the external device is an audio output device or the like but is not limited thereto.

The audio output device 60 is a device capable of outputting audio under the control of the control circuit 11. For example, the audio output device 60 is a speaker.

The printer unit 70 is a unit that forms an image on a sheet. The printer unit 70 forms an image on a sheet based on image data transmitted from the user terminal via the network using the print function. The printer unit 70 forms an image on a sheet based on image data generated by the scanner unit 30 using the copy function. Here, an example of the printer unit 70 using a tandem-type toner image transfer unit will be described. The printer unit 70 includes an accommodation unit 71, a conveying unit 72, an image forming unit 73, and a fixing device 74.

The accommodation unit 71 stores sheets for printing. The accommodation unit 71 includes a paper feed cassette and a pickup roller. The paper feed cassette accommodates sheets. The pickup roller picks up the sheets one by one from the paper feed cassette. The pickup roller supplies the picked sheet to the conveying unit 72.

The conveying unit 72 conveys sheets in the printer unit 70. The conveying unit 72 includes a plurality of rollers and registration rollers. The plurality of rollers include rollers that convey sheets fed by the pickup roller to the registration roller. The plurality of rollers include a roller that is provided downstream of the fixing device 74 and discharges the sheet to a discharge tray. The registration rollers convey the sheet to a transfer unit in accordance with the timing at which the transfer unit of the image forming unit 73 transfers the toner image onto the sheet.

The image forming unit 73 forms a toner image on the sheet. The image forming unit 73 includes an intermediate transfer belt, a plurality of developing units, an exposure device, the transfer unit, and the like. The intermediate transfer belt is an endless belt. The plurality of developing units correspond to the number of types of toner. The plurality of developing units include a black developing unit, a cyan developing unit, a magenta developing unit, and a yellow developing unit. Each developing unit includes a photoreceptor drum. Each developing unit includes a charger, a developing device, a primary transfer roller, a cleaning unit, and a static eliminator around the photoreceptor drum. The photoreceptor drum is a drum having a photoreceptor layer on the surface thereof. The charger uniformly charges the photoreceptor layer on the surface of the photoreceptor drum. The developing device develops the electrostatic latent image on the surface of the photoreceptor drum with toner. The developing device forms a toner image on the surface of the photoreceptor drum. The primary transfer roller faces the photoreceptor drum and sandwiches the intermediate transfer belt. The primary transfer roller transfers the toner image on the surface of the photoreceptor drum onto the intermediate transfer belt. The cleaning unit removes untransferred toner on the surface of the photoreceptor drum. The static eliminator irradiates the surface of the photoreceptor drum with light. The static eliminator neutralizes the photoreceptor layer of the photoreceptor drum by light irradiation. The exposure device irradiates the surface of the photoreceptor drum of each developing unit with a laser beam via an optical system such as a polygon mirror. The exposure device forms an electrostatic pattern as an electrostatic latent image on the surface of the photoreceptor drum. The transfer unit transfers the charged toner image on the surface of the intermediate transfer belt to a sheet. The transfer unit includes a support roller and a secondary transfer roller configured to sandwich the intermediate transfer belt and the sheet from both sides in the thickness direction.

The fixing device 74 applies heat and pressure to the sheet supplied from the image forming unit 73 and having the toner image formed thereon. The fixing device 74 fixes the toner image formed on the sheet to the sheet by heat and pressure.

The hardware configuration of the image forming apparatus 1 is not limited to the configuration described above. Components may be omitted and/or added as appropriate. The image forming apparatus 1 need not include the audio output device 60 therein in all embodiments. In other examples, the audio output device 60 or the like may be connected to the image forming apparatus 1 via the input and output interface 50.

The operations and functions of control circuit 11 will be described.

The control circuit 11 implements the functions of a detection unit 111, a display control unit 112, an audio control unit 113, and a setting unit 114. Each unit implemented in the control circuit 11 can also be considered a function performed by the control circuit 11 itself or in conjunction with other components.

The detection unit 111 detects user operations on the touch screen 21. User operations on the touch screen 21 include a swipe operation ("swipe gesture"), a double-tap operation, and a tap operation ("tap gesture").

A swipe operation is an example of an operation that moves one touched point on the touch screen 21 in a short time in chronological order. The swipe operation is an example of a first user operation. The swipe operation includes a downward swipe operation. The downward swipe operation is a swipe operation along a first direction from top to bottom. The downward swipe operation is an example of a third user operation. The swipe operation includes an upward swipe operation. The upward swipe operation is a swipe operation along a second direction from bottom to top opposite to the first direction. The upward swipe operation is an example of a fourth user operation.

The swipe operation is an operation to input instructions such as the following.

First, the case where the touch screen 21 displays an image having a plurality of display areas that can be set as the display area in the selected state will be described. The display area is an area for displaying characters. The display area may be an area whose outer edge can be recognized by a frame or the like. The display area may be a virtual area that does not have a frame or the like and whose outer edge is not recognizable. The selected state is a state selected for executing processing associated with the display area in the selected state. The selected state is also called a focused state. The display area in the selected state is one display area. In this example, the swipe operation is an operation of inputting an instruction to the control circuit 11 to change the display area in the selected state from a first display area to a second display area. The first display area is one of the plurality of display areas. The first display area is a display area in the selected state before the swipe operation. The first display area is a display area that transitions from the display area in the selected state to a display area not in the selected state based on a swipe operation. The second display area is one of the plurality of display areas that is different from the first display area. The second display area is a display area not in the selected state before the swipe operation. The second display area is a display area that transitions from a display area not in the selected state to the display area in the selected state based on a swipe operation. Next, the case where the touch screen 21 displays an image having one display area that can be set as the display area in the selected state will be described. In this example, the swipe operation is an operation of inputting an instruction to the control circuit 11 to change the numerical value displayed in one display area.

The double-tap operation is an example of an operation in which a tap operation of contacting one point on the touch screen 21 and then releasing the contact is repeated twice. The double-tap operation is an example of a second user operation. The double-tap operation is an operation of inputting an instruction to the control circuit 11 to execute processing associated with the display area in the selected state.

The tap operation is an example of an operation of contacting one point on the touch screen 21 and then releasing the contact. The tap operation is an example of a fifth user operation. The tap operation is an operation of inputting an instruction to the control circuit 11 to output information corresponding to the display area in the selected state by audio from the audio output device 60. The information corresponding to the display area in the selected state includes information related to the display in the display area in the selected state. The information related to the display in the display area in the selected state may be information indicating the characters displayed in the display area in the selected state. The information indicating the characters displayed in the display area in the selected state only needs to include at least the characters displayed in the display area in the selected state. The information related to the display in the display area in the selected state may be information indicating the contents of characters displayed in the display area in the selected state. The information indicating the contents of the characters displayed in the display area in the selected state only needs to include at least the same contents as the characters displayed in the display area in the selected state. The audio output device 60 repeatedly outputs information corresponding to the same display area in the selected state by audio for each tap operation by the user.

The user operation on the touch screen 21 does not have to be performed in the display area in the selected state and may be performed at any place (position) on the touch screen 21. Therefore, the upward swipe operation, the downward swipe operation, the tap operation, and the double-tap operation can be performed anywhere on the touch screen 21.

The display control unit 112 controls display on the touch screen 21. In the following description, "to display" in the processing of the display control unit 112 includes a control to display. The display control unit 112 displays an image on the touch screen 21. The display control unit 112 displays the display area in the selected state in a recognizable mode. Recognizable modes are visual modes such as colors or patterns but not limited thereto. The recognizable mode may be a color that enables a partially sighted user to recognize the display area in the selected state.

The audio control unit 113 controls the audio output device 60 to output information corresponding to the display area in the selected state by audio based on the user operation on the touch screen 21. Outputting the information corresponding to the display area in the selected state by audio based on the user operation means outputting the information corresponding to the display area in the selected state by audio after the user operation. The audio control unit 113 performs control so that information regarding the display in the display area in the selected state is output by audio for each user operation on the touch screen 21.

The setting unit 114 sets data for setting items. In one example, the setting unit 114 sets default data for setting items. In another example, the setting unit 114 sets data for setting items based on user operations on the touch screen 21.

Image Example

Figure 2:
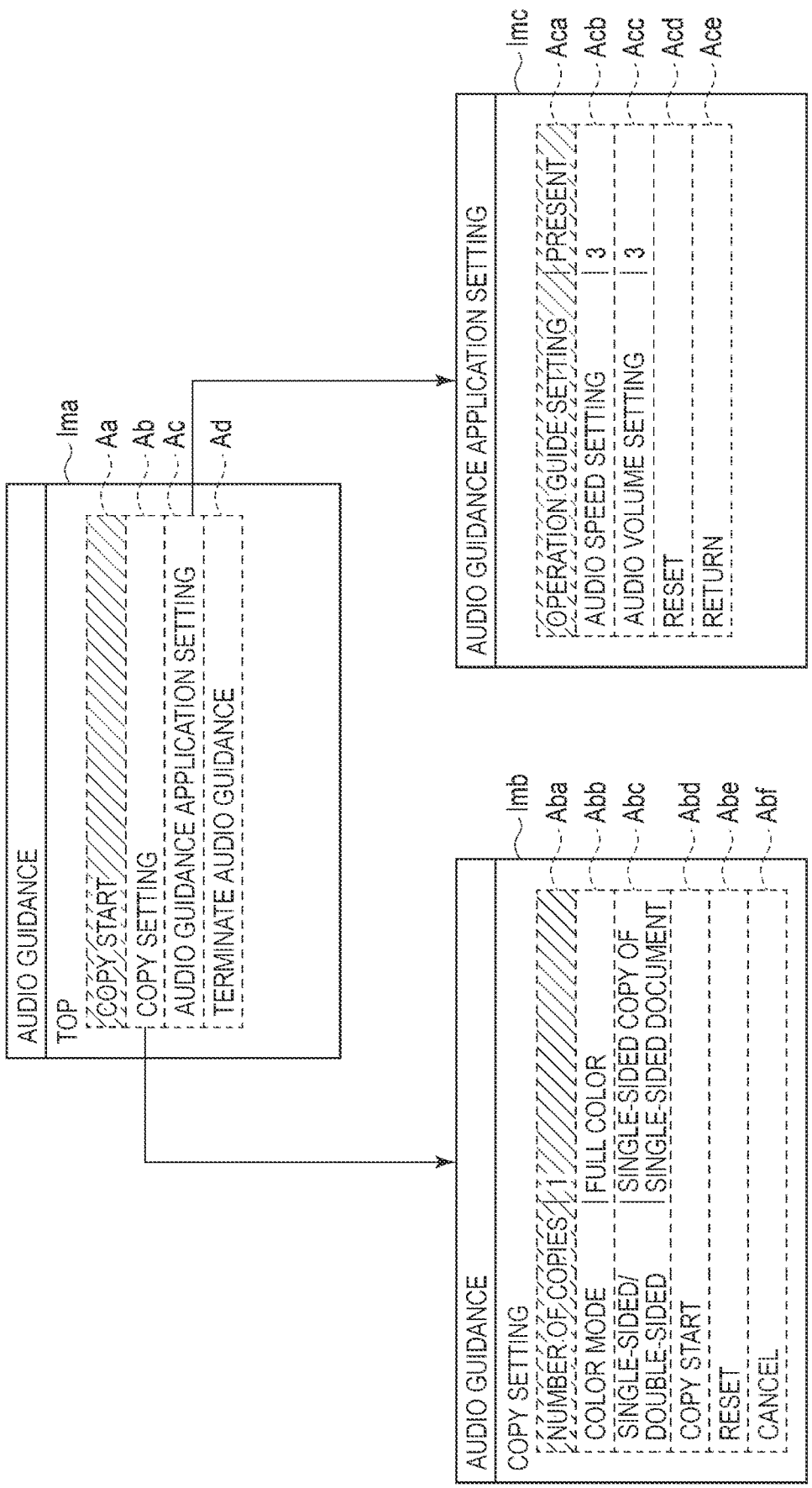
FIG. 2 is a diagram illustrating an example of the transition from a top image displayed on a touch screen to another image.

FIG. 2 is a diagram showing an example of the transition from a top image Ima displayed on the touch screen 21 to another image.

The display control unit 112 displays the top image Ima on the touch screen 21 based on a user operation on the touch screen 21. The top image Ima includes a plurality of display areas Aa to Ad. The top image Ima displays the plurality of display areas Aa to Ad arranged in the first direction in the order of the display area Aa, the display area Ab, the display area Ac, and the display area Ad. The display area Aa is the leading display area along the first direction among the plurality of display areas Aa to Ad. If the first direction is a top-to-bottom direction, the leading display area is also referred to as the topmost display area. The display area Ad is the last display area along the first direction among the plurality of display areas Aa to Ad. If the first direction is a top-to-bottom direction, the last display area is also referred to as the bottom display area. The leading display area is a display area virtually adjacent to the last display area along the first direction in relation to the last display area. The last display area is a display area virtually adjacent to the leading display area along the second direction in relation to the leading display area. If the top image Ima is displayed on the touch screen 21, the display control unit 112 changes and displays the display area in the selected state from the first display area to the second display area among the plurality of display areas Aa to Ad based on a swipe operation.

The display area Aa displays "copy start" in characters. A case where the display area Aa is the display area in the selected state in the top image Ima will be described. The display area Aa is an area in which an instruction for starting the copy function with default data set for a plurality of copy setting items can be input based on a double-tap operation. The display control unit 112 displays an image for confirming the start of copying on the touch screen 21 based on the double-tap operation.

The setting display area Ab displays "copy setting" in characters. A case where the display area Ab is the display area in the selected state in the top image Ima will be described. The display area Ab is an area in which an instruction for displaying a copy setting image Imb can be input based on a double-tap operation. The display control unit 112 displays the copy setting image Imb on the touch screen 21 with the display area Aba as the display area in the selected state based on the double-tap operation.

The display area Ac displays "audio guidance application settings" in characters. A case where the display area Ac is the display area in the selected state in the top image Ima will be described. The display area Ac is an area in which an instruction for displaying an audio guidance setting image Imc can be input based on a double-tap operation. The display control unit 112 displays the audio guidance setting image Imc on the touch screen 21 with the display area Aca as the display area in the selected state based on the double-tap operation.

The display area Ad displays "terminate audio guidance" in characters. A case where the display area Ad is the display area in the selected state in the top image Ima will be described. The display area Ad is an area in which an instruction to terminate the audio guidance can be input based on a double-tap operation. The display control unit 112 displays a predetermined image on the touch screen 21 based on the double-tap operation.

Figure 3:
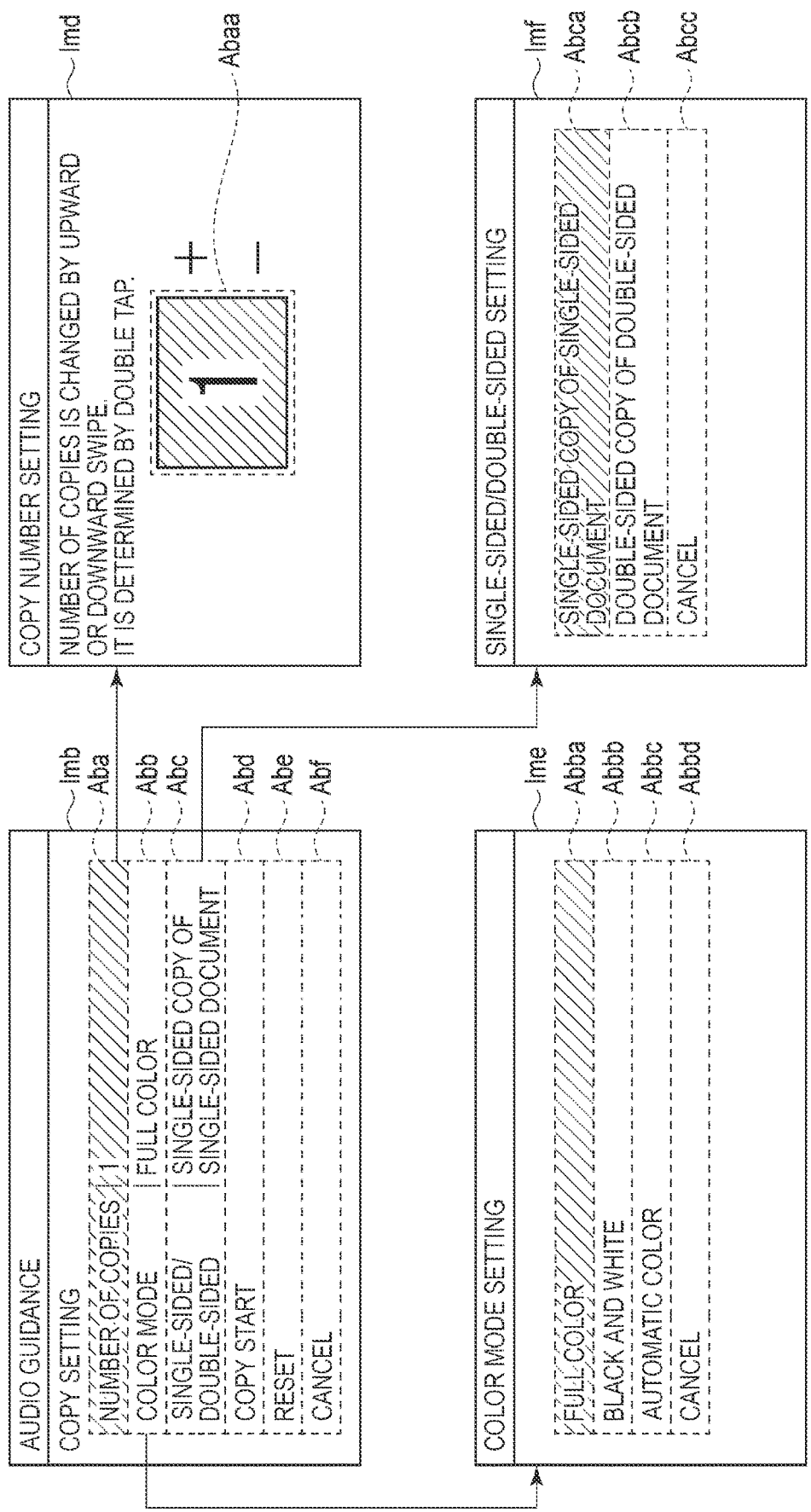
FIG. 3 is a diagram illustrating an example of the transition from a copy setting image displayed on the touch screen to another image.

FIG. 3 is a diagram showing an example of the transition from the copy setting image Imb displayed on the touch screen 21 to another image.

The copy setting image Imb is an image for setting data for a plurality of copy setting items. The copy setting image Imb includes a plurality of display areas Aba to Abf. The copy setting image Imb displays the plurality of display areas Aba to Abf arranged in the first direction in the order of the display area Aba, the display area Abb, the display area Abc, the display area Abd, the display area Abe, and the display area Abf. The display area Aba is the leading display area along the first direction among the plurality of display areas Aba to Abf. The display area Abf is the last display area along the first direction among the plurality of display areas Aba to Abf. If the copy setting image Imb is displayed on the touch screen 21, the display control unit 112 changes and displays the display area in the selected state from a first display area to a second display area among the plurality of display areas Aba to Abf based on a swipe operation.

The display area Aba is a display area related to the copy number setting item. The copy number setting item is an item for setting the number of copies. The copy number setting item is an example of the copy setting item set for the copy function. The setting of the number of copies is an example of the copy setting before executing the copy function. Since the number of copies is an example of a numerical value, the copy number setting item is an example of a numerical value setting item for setting a numerical value. The display area Aba displays the "number of copies" indicating the copy number setting item in characters. The display area Aba displays the number of copies set for the copy number setting item by the setting unit 114 in characters. For example, the number of copies that can be set is any value up to a predetermined value. Before the setting unit 114 sets the number of copies based on a user operation, the display area Aba displays the default number of copies "1".

A case where the display area Aba is the display area in the selected state in the copy setting image Imb will be described. The display area Aba is an area in which an instruction for displaying a copy number setting image Imd can be input based on a double-tap operation. The display control unit 112 displays the copy number setting image Imd on the touch screen 21 with the display area Abaa as the display area in the selected state based on the double-tap operation. The display control unit 112 displays, in the display area Abaa, the number of copies set for the copy number setting item displayed in the display area Aba before the copy number setting image Imd is displayed. For example, it is assumed that the display area Aba of the copy setting image Imb displays the number of copies "1" before displaying the copy number setting image Imd. In this example, the display area Abaa of the copy number setting image Imd displays the number of copies "1".

The display area Abb is a display area for a color mode setting item. The color mode setting item is an item for setting the color mode. A color mode setting item is an example of the copy setting item. The color mode setting is an example of copy setting. The display area Abb displays "color mode" indicating the color mode setting item in characters. The display area Abb displays the color mode set for the color mode setting item by the setting unit 114. For example, color modes that can be set are full color, black and white, or automatic color. Before the setting unit 114 sets the color mode based on the user operation, the display area Abb displays the default color mode "full color" in characters.

A case where the display area Abb is the display area in the selected state in the copy setting image Imb will be described. The display area Abb is an area in which an instruction for displaying a color mode setting image Ime can be input based on a double-tap operation. The display control unit 112 displays the color mode setting image Ime on the touch screen 21 based on the double-tap operation. The display control unit 112 displays the color mode setting image Ime with the display area displaying the color mode set for the color mode setting item as the display area in the selected state. The color mode set for the color mode setting item is the color mode displayed in the display area Abb before the color mode setting image Ime is displayed. For example, it is assumed that the display area Abb of the copy setting image Imb displays the color mode "full color" before displaying the color mode setting image Ime. In this example, the color mode setting image Ime displays the display area Abba displaying the color mode "full color" as the display area in the selected state.

The display area Abc is a display area related to single-sided/double-sided setting items. The single-sided/double-sided setting item is an item for setting the single-sided/double-sided mode. The single-sided/double-sided mode is a mode for setting the correspondence relationship between the reading side of the document and the printing side of the sheet after copying. The single-sided/double-sided setting item is an example of the copy setting item. Single-sided/double-sided setting is an example of copy setting. The display area Abc displays "single-sided/double-sided", which indicates the single-sided/double-sided setting item, in characters. The display area Abc displays in characters the single-sided/double-sided mode set for the single-sided/double-sided setting item by the setting unit 114. For example, the single-sided/double-sided mode that can be set is a single-sided copying mode for a single-sided document or a double-sided copying mode for double-sided documents. Before the setting unit 114 sets the single-sided/double-sided mode based on the user operation, the display area Abc displays the default single-sided/double-sided mode "single-sided document to single-sided copy".

A case where the display area Abc is the display area in the selected state in the copy setting image Imb will be described. The display area Abc is an area in which an instruction for displaying the single-sided/double-sided setting image Imf can be input based on a double-tap operation. The display control unit 112 displays a single-sided/double-sided setting image Imf on the touch screen 21 based on the double-tap operation. The display control unit 112 displays the single-sided/double-sided setting image Imf with the display area displaying the single-sided/double-sided mode set for the single-sided/double-sided setting item as the display area in the selected state. The single-sided/double-sided mode set for the single-sided/double-sided setting item is the single-sided/double-sided mode displayed in the display area Abc before the single-sided/double-sided setting image Imf is displayed. For example, it is assumed that the display area Abc of the copy setting image Imb displays the single-sided/double-sided mode "single-sided document to single-sided copy" before displaying the single-sided/double-sided setting image Imf. In this example, the single-sided/double-sided setting image Imf displays the display area Abca displaying the single-sided/double-sided mode "single-sided document to single-sided copy" as the display area in the selected state.

The display area Abd displays "copy start" in characters. A case where the display area Abd is the display area in the selected state in the copy setting image Imb will be described. The display area Abd is an area in which an instruction can be input for starting the copy function with data set for a plurality of copy setting items based on a double-tap operation. The display control unit 112 displays an image for confirming the start of copying on the touch screen 21 based on the double-tap operation.

The display area Abe displays "reset" in characters. A case where the display area Abe is the display area in the selected state in the copy setting image Imb will be described. The display area Abe is an area in which an instruction can be input for resetting data set for the plurality of copy setting items to default data based on a double-tap operation. The display control unit 112 displays on the touch screen 21 the copy setting image Imb in which the plurality of copy setting items are reset to default data based on the double-tap operation.

The display area Abf displays "cancel" in characters. A case where the display area Abf is the display area in the selected state in the copy setting image Imb will be described. The display area Abf is an area in which an instruction can be input for displaying the top image Ima based on a double-tap operation. The display control unit 112 displays the top image Ima on the touch screen 21 with the display area Ab as the display area in the selected state based on the double-tap operation.

The copy number setting image Imd is an image for setting the number of copies for the copy number setting item. The copy number setting image Imd has one display area Abaa.

The display area Abaa is a display area for the number of copies set for the copy number setting item. The display area Abaa displays the number of copies in characters. If the copy number setting image Imd is displayed on the touch screen 21, the display control unit 112 changes and displays the number of copies in the display area Abaa based on the swipe operation without changing the display area in the selected state from the display area Abaa. The display area Abaa is an area in which an instruction can be input for setting the number of copies displayed in the display area Abaa to the copy number setting item based on a double-tap operation.

The processing of the control circuit 11 based on the double-tap operation if the copy number setting image Imd is displayed on the touch screen 21 will be described. The setting unit 114 sets the number of copies displayed in the display area Abaa for the copy number setting item based on the double-tap operation. The display control unit 112 displays the copy setting image Imb on the touch screen 21 with the display area Aba as the display area in the selected state based on the double-tap operation. The display control unit 112 displays the number of copies set by the setting unit 114 in the display area Aba of the copy setting image Imb.

The color mode setting image Ime is an image for setting the color mode for the color mode setting item. The color mode setting image Ime has a plurality of display areas Abba to Abbd. The color mode setting image Ime displays the plurality of display areas Abba to Abbd arranged in the first direction in the order of the display area Abba, the display area Abbb, the display area Abbc, and the display area Abbd. The display area Abba is the leading display area along the first direction among the plurality of display areas Abba to Abbd. The display area Abbd is the last display area in the first direction among the plurality of display areas Abba to Abbd. If the color mode setting image Ime is displayed on the touch screen 21, the display control unit 112 changes and displays the display area in the selected state from the first display area to the second display area among the plurality of display areas Abba to Abbd based on the swipe operation.

The display area Abba is the color mode display area set for the color mode setting item. The display area Abba displays the color mode "full color" in characters. A case where the display area Abba is the display area in the selected state in the color mode setting image Ime will be described. The display area Abba is an area in which an instruction can be input for setting the color mode "full color" displayed in the display area Abba for the color mode setting item based on a double-tap operation. The setting unit 114 sets the color mode "full color" displayed in the display area Abba for the color mode setting item based on the double-tap operation. The display control unit 112 displays the copy setting image Imb on the touch screen 21 with the display area Abb as the display area in the selected state based on the double-tap operation. The display control unit 112 displays the color mode "full color" set by the setting unit 114 in the display area Abb of the copy setting image Imb.

The display area Abbb is the color mode display area set for the color mode setting item. The display area Abbb displays the color mode "black and white" in characters. A case where the display area Abbb is the display area in the selected state in the color mode setting image Ime will be described. The display area Abbb is an area in which an instruction can be input for setting the color mode "black and white" displayed in the display area Abbb for the color mode setting item based on a double-tap operation. The setting unit 114 sets the color mode "black and white" displayed in the display area Abbb for the color mode setting item based on the double-tap operation. The display control unit 112 displays the copy setting image Imb on the touch screen 21 with the display area Abb as the display area in the selected state based on the double-tap operation. The display control unit 112 displays the color mode "black and white" set by the setting unit 114 in the display area Abb of the copy setting image Imb.

The display area Abbc is the color mode display area set for the color mode setting item. The display area Abbc displays the color mode "automatic color" in characters. A case where the display area Abbc is the display area in the selected state in the color mode setting image Ime will be described. The display area Abbc is an area in which an instruction can be input for setting the color mode "automatic color" displayed in the display area Abbc for the color mode setting item based on a double-tap operation. The setting unit 114 sets the color mode "automatic color" displayed in the display area Abbc for the color mode setting item based on the double-tap operation. The display control unit 112 displays the copy setting image Imb on the touch screen 21 with the display area Abb as the display area in the selected state based on the double-tap operation. The display control unit 112 displays the color mode "automatic color" set by the setting unit 114 in the display area Abb of the copy setting image Imb.

The display area Abbd displays "cancel" in characters. A case where the display area Abbd is the display area in the selected state in the color mode setting image Ime will be described. The display area Abbd is an area in which an instruction can be input for displaying the copy setting image Imb based on a double-tap operation. The display control unit 112 displays the copy setting image Imb on the touch screen 21 with the display area Abb as the display area in the selected state based on the double-tap operation.

The single-sided/double-sided setting image Imf is an image for setting the single-sided/double-sided mode for the single-sided/double-sided setting item. The single-sided/double-sided setting image Imf has a plurality of display areas Abca to Abcc. The single-sided/double-sided setting image Imf displays the plurality of display areas Abca to Abcc arranged in the first direction in the order of the display area Abca, the display area Abcb, and the display area Abcc. The display area Abca is the leading display area along the first direction among the plurality of display areas Abca to Abcc. The display area Abcc is the last display area along the first direction among the plurality of display areas Abca to Abcc. If the single-sided/double-sided setting image Imf is displayed on the touch screen 21, the display control unit 112 changes the display area in the selected state from the first display area to the second display area among the plurality of display areas Abca to Abcc based on the swipe operation.

The display area Abca is a single-sided/double-sided mode display area set for the single-sided/double-sided setting items. The display area Abca displays the single-sided/double-sided mode "single-sided document to single-sided copy" in characters. A case where the display area Abca in the single-sided/double-sided setting image Imf is the display area in the selected state will be described. The display area Abca is an area in which an instruction can be input for setting the single-sided/double-sided mode "single-sided document to single-sided copy" displayed in the display area Abca for the single-sided/double-sided setting items based on the double-tap operation. The setting unit 114 sets the single-sided/double-sided mode "single-sided document to single-sided copy" displayed in the display area Abca for the single-sided/double-sided setting items based on the double-tap operation. The display control unit 112 displays the copy setting image Imb on the touch screen 21 with the display area Abc as the display area in the selected state based on the double-tap operation. The display control unit 112 displays the single-sided/double-sided mode "single-sided document to single-sided copy" set by the setting unit 114 in the display area Abc of the copy setting image Imb.

The display area Abcb is a single-sided/double-sided mode display area set for the single-sided/double-sided setting items. The display area Abcb displays the single-sided/double-sided mode "double-sided document to double-sided copy" in characters. A case where the display area Abcb is the display area in the selected state in the single-sided/double-sided setting image Imf will be described. The display area Abcb is an area in which an instruction can be input for setting the single-sided/double-sided mode "double-sided document to double-sided copy" displayed in the display area Abcb for the single-sided/double-sided setting items based on a double-tap operation. The setting unit 114 sets the single-sided/double-sided mode "double-sided document to double-sided copy" displayed in the display area Abcb for the single-sided/double-sided setting items based on the double-tap operation. The display control unit 112 displays the copy setting image Imb on the touch screen 21 with the display area Abc as the display area in the selected state based on the double-tap operation. The display control unit 112 displays the single-sided/double-sided mode "double-sided document to double-sided copy" set by the setting unit 114 in the display area Abc of the copy setting image Imb.

The display area Abcc displays "cancel" in characters. A case where the display area Abcc in the single-sided/double-sided setting image Imf is the display area in the selected state will be described. The display area Abcc is an area in which an instruction can be input for displaying the copy setting image Imb based on a double-tap operation. The display control unit 112 displays the copy setting image Imb on the touch screen 21 with the display area Abc as the display area in the selected state based on the double-tap operation.

Figure 4:
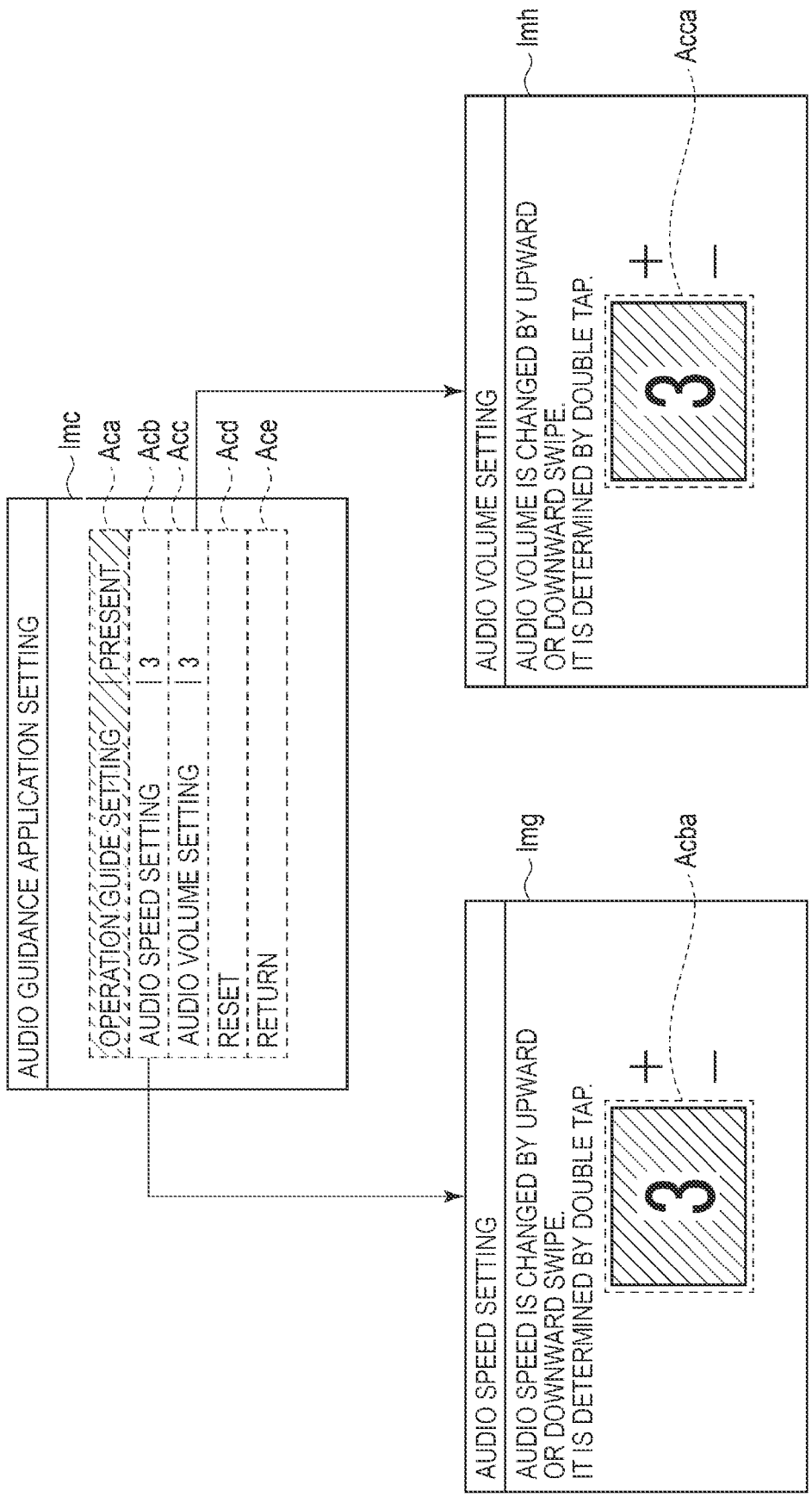
FIG. 4 is a diagram showing an example of the transition from an audio guidance setting image displayed on the touch screen to another image.

FIG. 4 is a diagram showing an example of the transition from the audio guidance setting image Imc displayed on the touch screen 21 to another image.

The audio guidance setting image Imc is an image for setting data for a plurality of audio guidance setting items.

The audio guidance setting image Imc has a plurality of display areas Aca to Ace. The audio guidance setting image Imc displays the plurality of display areas Aca to Ace arranged in the first direction in the order of the display area Aca, the display area Acb, the display area Acc, the display area Acd, and the display area Ace. The display area Aca is the leading display area along the first direction among the plurality of display areas Aca to Ace. The display area Ace is the last display area in the first direction among the plurality of display areas Aca to Ace. If the audio guidance setting image Imc is displayed on the touch screen 21, the display control unit 112 changes and displays the display area in the selected state from the first display area to the second display area among the plurality of display areas Aca to Ace based on the swipe operation.

The display area Aca is a display area for the operation guide setting items at startup. The operation guide setting items at startup is an item for setting audio guidance of operation guide at startup. The operation guide setting items at startup is an example of the audio guidance setting items that are set for audio guidance. The display area Aca displays "operation guide setting" indicating the operation guide setting items at startup in characters. The display area Aca displays in characters the presence or absence of setting set by the setting unit 114 for the operation guide setting items at startup. Before the setting unit 114 sets the presence or absence of the setting based on the user operation, the display area Aca displays the default "present".

A case where the display area Aca is the display area in the selected state in the audio guidance setting image Imc will be described. The display area Aca is an area in which an instruction can be input for displaying an operation guide setting image based on a double-tap operation. The operation guide setting image is an image for setting whether or not the operation guide setting items are set at startup. The display control unit 112 displays the operation guide setting image on the touch screen 21 based on the double-tap operation.

The display area Acb is a display area for the audio speed setting item. The audio speed setting item is an item for setting the audio speed of audio guidance. The audio speed setting item is an example of the audio guidance setting items. The audio speed setting is an example of the audio setting for audio guidance. Since the audio speed is an example of a numerical value, the audio speed setting item is an example of the numerical value setting item. The display area Acb displays "audio speed setting" indicating the audio speed setting item in characters. The display area Acb displays the audio speed set for the audio speed setting item by the setting unit 114 in characters. For example, the audio speed that can be set is any level value up to a predetermined level, such as 10. Before the setting unit 114 sets the audio speed based on the user operation, the display area Acb displays the default audio speed "3".

A case where the display area Acb is the display area in the selected state in the audio guidance setting image Imc will be described. The display area Acb is an area in which an instruction can be input for displaying the audio speed setting image Img based on a double-tap operation. The display control unit 112 displays the audio speed setting image Img on the touch screen 21 with the display area Acba as the display area in the selected state based on the double-tap operation. The display control unit 112 displays, in the display area Acba, the audio speed set for the audio speed setting item displayed in the display area Acb before the audio speed setting image Img is displayed. For example, it is assumed that the display area Acb of the audio guidance setting image Imc displays the audio speed "3" before the audio speed setting image Img is displayed. In this example, the display area Acba of the audio speed setting image Img displays the audio speed "3".

The display area Acc is a display area related to volume setting items. The volume setting item is an item for setting the volume of audio guidance. The volume setting item is an example of the audio guidance setting items. The volume setting is an example of an audio setting. Since volume is an example of a numerical value, the volume setting item is an example of the numerical value setting item. The display area Acc displays "volume setting" indicating the volume setting item in characters. The display area Acc displays the volume set for the volume setting item by the setting unit 114 in characters. For example, the volume that can be set is any level value up to a predetermined level, such as 10. Before the setting unit 114 sets the volume based on the user operation, the display area Acc displays the default volume "3".

A case where the display area Acc is the display area in the selected state in the audio guidance setting image Imc will be described. The display area Acc is an area in which an instruction can be input for displaying the volume setting image Imh based on a double-tap operation. The display control unit 112 displays the volume setting image Imh on the touch screen 21 with the display area Acca as the display area in the selected state based on the double-tap operation. The display control unit 112 displays in the display area Acca the volume set for the volume setting item displayed in the display area Acc before the volume setting image Imh is displayed. For example, it is assumed that the display area Acc of the audio guidance setting image Imc displays the volume "3" before the volume setting image Imh is displayed. In this example, the display area Acca of the volume setting image Imh displays volume "3".

The display area Acd displays "reset" in characters. A case where the display area Acd is the display area in the selected state in the audio guidance setting image Imc will be described. The display area Acd is an area in which an instruction can be input for resetting data set for the plurality of audio guidance setting items to default data based on a double-tap operation. The display control unit 112 displays on the touch screen 21 the audio guidance setting image Imc in which the plurality of audio guidance setting items are reset to default data based on the double-tap operation.

The display area Ace displays "return" in characters. A case where the display area Ace is the display area in the selected state in the audio guidance setting image Imc will be described. The display area Ace is an area in which an instruction can be input for displaying the top image Ima based on a double-tap operation. The display control unit 112 displays the top image Ima on the touch screen 21 with the display area Ac as the display area in the selected state based on the double-tap operation.

The audio speed setting image Img will be described.

The audio speed setting image Img is an image for setting the audio speed for the audio speed setting item. The audio speed setting image Img has one display area Acba.

The display area Acba is the display area for the audio speed set for the audio speed setting item. The display area Acba displays the audio speed in characters. If the audio speed setting image Img is displayed on the touch screen 21, the display control unit 112 changes and displays the audio speed in the display area Acba based on the swipe operation without changing the display area in the selected state from the display area Acba. The display area Acba is an area in which an instruction can be input for setting the audio speed displayed in the display area Acba for the audio speed setting item based on a double-tap operation.

The processing of the control circuit 11 based on the double-tap operation if the audio speed setting image Img is displayed on the touch screen 21 will be described. The setting unit 114 sets the audio speed displayed in the display area Acba for the audio speed setting item based on the double-tap operation. The display control unit 112 displays the audio guidance setting image Imc on the touch screen 21 with the display area Acb as the display area in the selected state based on the double-tap operation. The display control unit 112 displays the audio speed set by the setting unit 114 in the display area Acb of the audio guidance setting image Imc.

The volume setting image Imh is an image for setting the volume for the volume setting item. The volume setting image Imh has one display area Acca.

The display area Acca is a display area of the volume set for the volume setting item. The display area Acca displays the volume in characters. If the volume setting image Imh is displayed on the touch screen 21, the display control unit 112 changes and displays the volume in the display area Acca based on the swipe operation without changing the display area in the selected state from the display area Acca. The display area Acba is an area in which an instruction can be input for setting the volume displayed in the display area Acca for the volume setting item based on a double-tap operation.

The processing of the control circuit 11 based on the double-tap operation if the volume setting image Imh is displayed on the touch screen 21 will be described. The setting unit 114 sets the volume displayed in the display area Acca for the volume setting item based on the double-tap operation. The display control unit 112 displays the audio guidance setting image Imc on the touch screen 21 with the display area Acc as the display area in the selected state based on the double-tap operation. The display control unit 112 displays the volume set by the setting unit 114 in the display area Acc of the audio guidance setting image Imc.

Next, several examples of image transitions based on user operations will be described.

Figure 5:
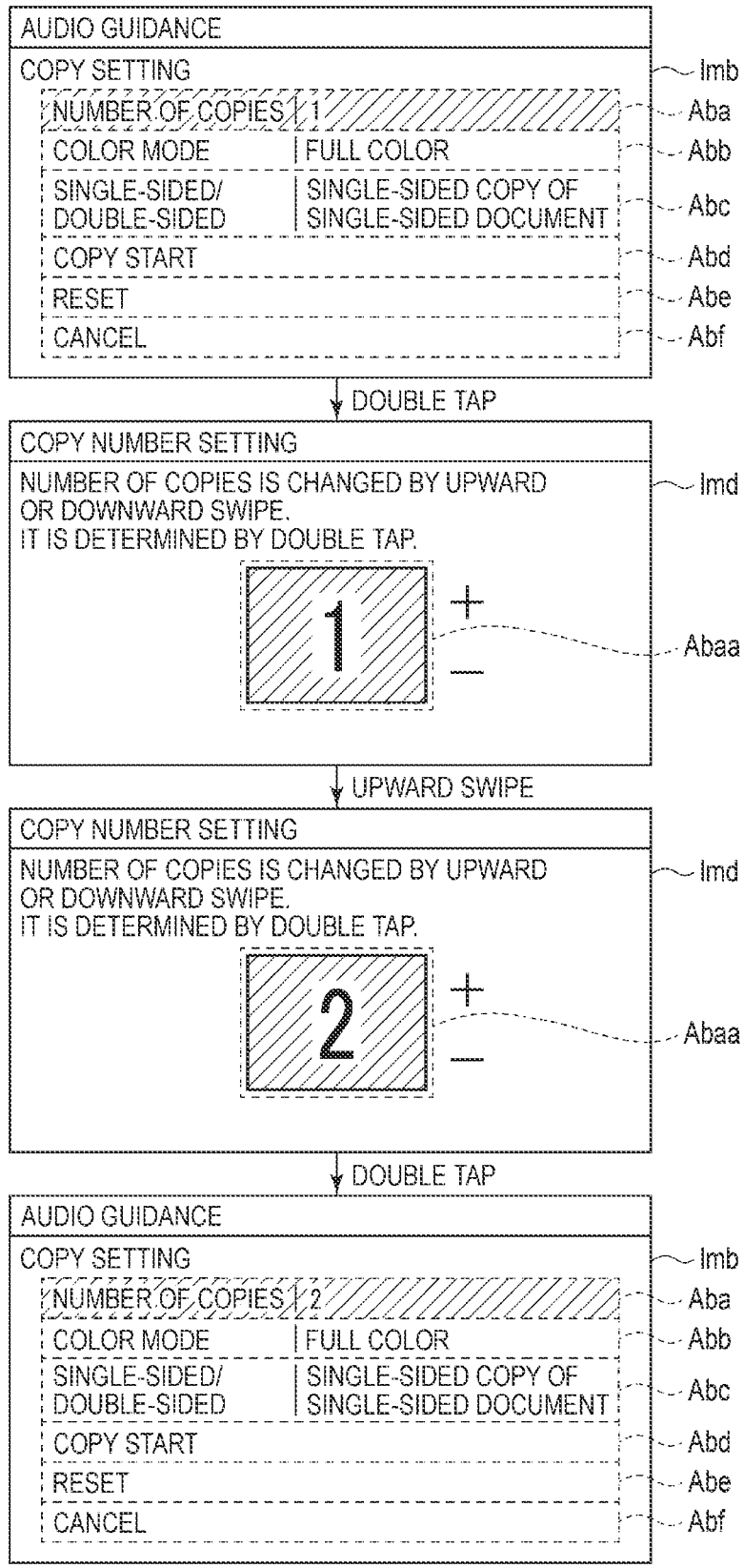
FIG. 5 is a diagram showing an example of image transition associated with the setting of the number of copies displayed on the touch screen.

FIG. 5 is a diagram showing an example of the image transition associated with the setting of the number of copies displayed on the touch screen 21. FIG. 5 shows an example in which the user changes the number of copies from one to two.

The touch screen 21 displays the copy setting image Imb with the display area Aba as the display area in the selected state. The display area Aba displays the number of copies "1". It is assumed that the user performed a double-tap operation. The touch screen 21 displays the copy number setting image Imd with the display area Abaa as the display area in the selected state based on the double-tap operation. The touch screen 21 may display the copy number setting image Imd instead of the copy setting image Imb. The touch screen 21 may display the copy number setting image Imd superimposed on the copy setting image Imb. The display area Abaa displays the number of copies "1" displayed in the display area Aba before the copy number setting image Imd is displayed. It is assumed that the user performed an upward swipe operation. Based on the upward swipe operation, the touch screen 21 displays the number of copies "2" in the display area Abaa without changing the display area in the selected state from the display area Abaa. It is assumed that the user performed a double-tap operation. The touch screen 21 displays the copy setting image Imb with the display area Aba as the display area in the selected state based on the double-tap operation. The display area Aba displays the number of copies "2".

Figure 6:
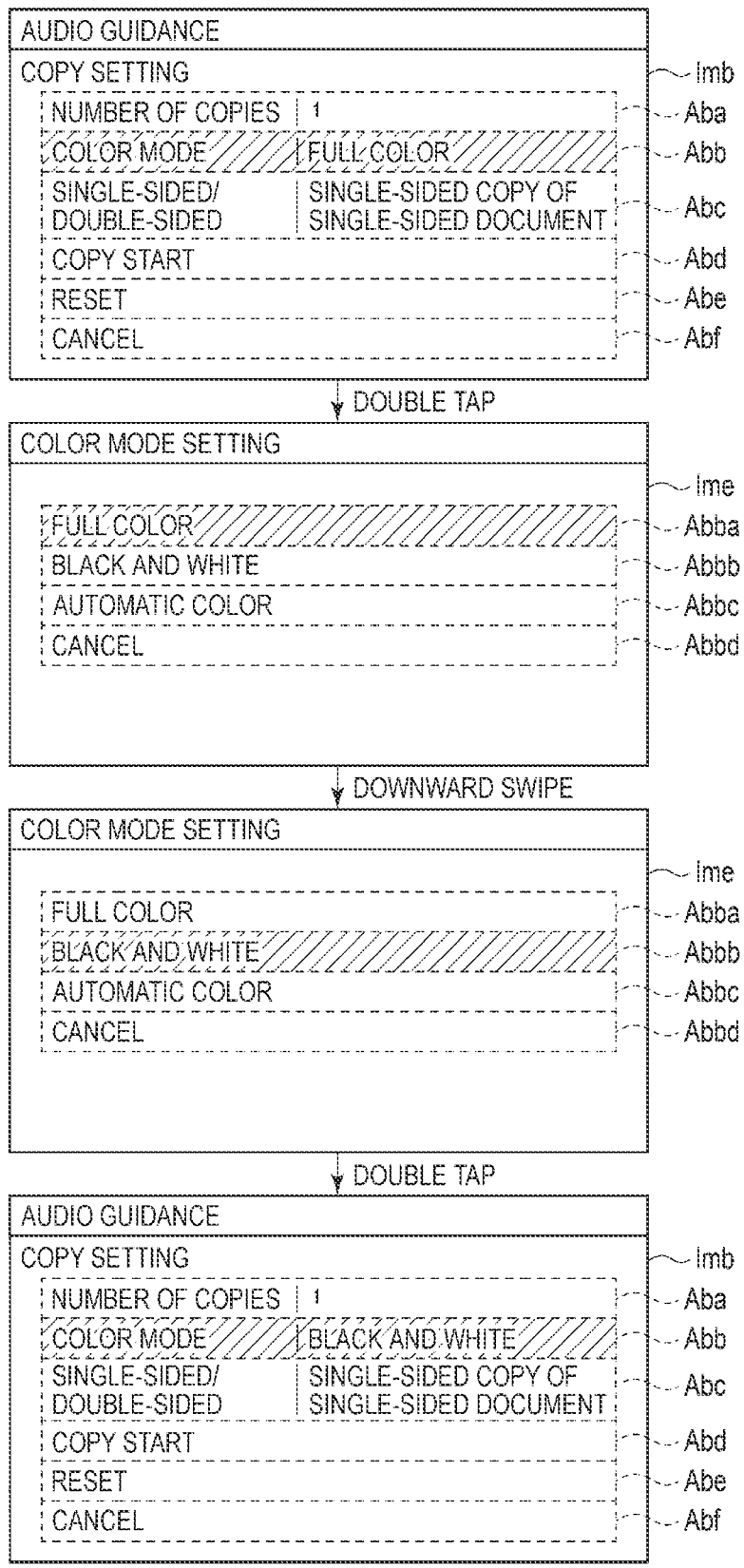
FIG. 6 is a diagram showing an example of image transition associated with the color mode setting displayed on the touch screen.

FIG. 6 is a diagram showing an example of image transition associated with color mode setting displayed on the touch screen 21. FIG. 6 shows an example in which the user changes the color mode from full color to black and white.

The touch screen 21 displays the copy setting image Imb with the display area Abb as the display area in the selected state. The display area Abb displays the color mode "full color". It is assumed that the user performed a double-tap operation. The touch screen 21 displays the color mode setting image Ime with the display area Abba displaying the color mode "full color" as the display area in the selected state based on the double-tap operation. The touch screen 21 may display the color mode setting image Ime instead of the copy setting image Imb. The touch screen 21 may display the color mode setting image Ime superimposed on the copy setting image Imb. It is assumed that the user performed a downward swipe operation. Based on the downward swipe operation, the touch screen 21 changes and displays the display area in the selected state from the display area Abba to the display area Abbb for displaying the color mode "black and white". It is assumed that the user performed a double-tap operation. The touch screen 21 displays the copy setting image Imb with the display area Abb as the display area in the selected state based on the double-tap operation. The display area Abb displays the color mode "black and white".

Figure 7:
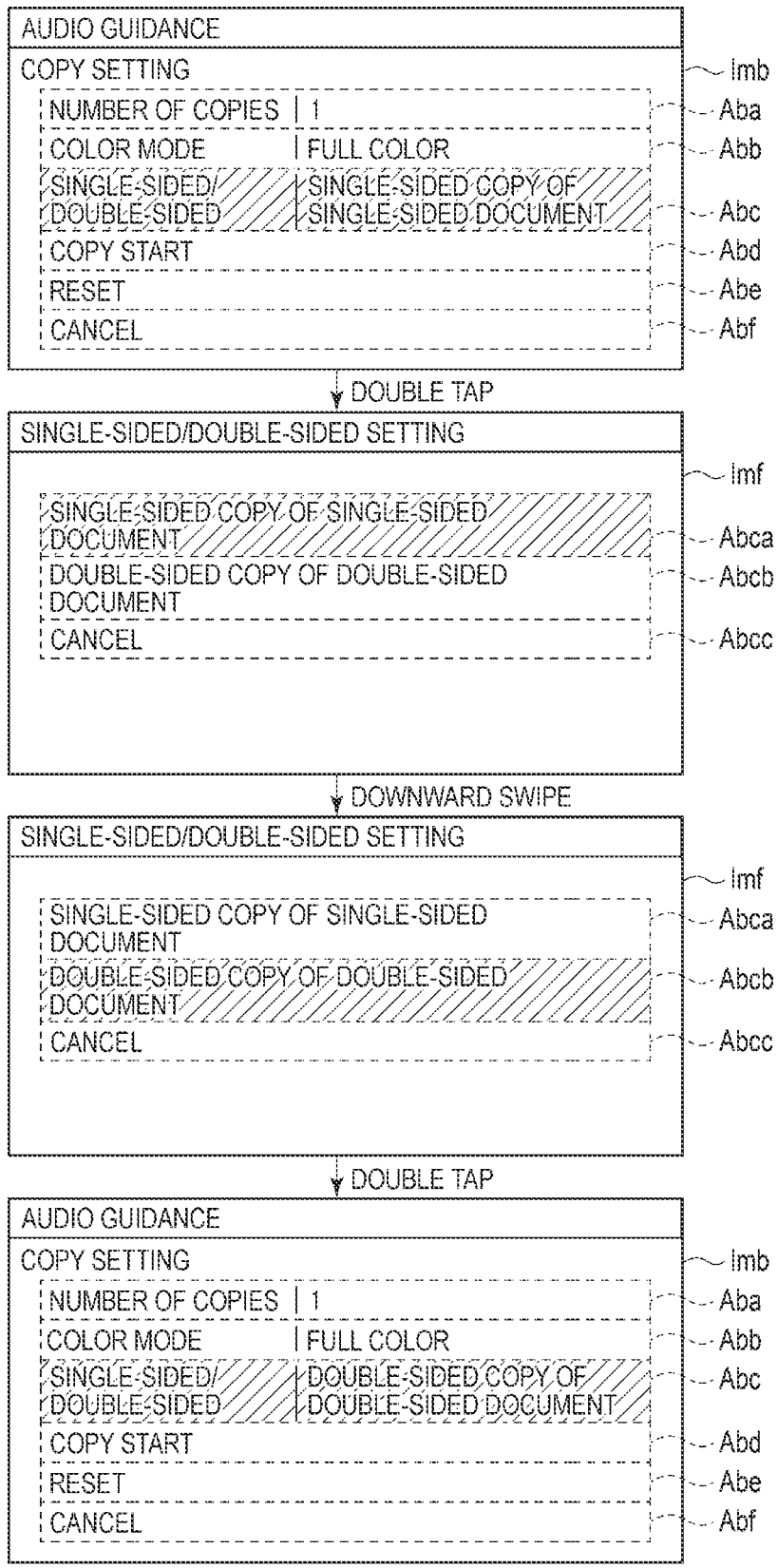
FIG. 7 is a diagram showing an example of image transition associated with single-sided/double-sided setting displayed on the touch screen.

FIG. 7 is a diagram showing an example of the image transition associated with the single-sided/double-sided setting displayed on the touch screen 21. FIG. 7 shows an example in which the user changes the single-sided/double-sided mode from a single-sided copying mode for single-sided document to a double-sided copying mode for double-sided document.

The touch screen 21 displays the copy setting image Imb with the display area Abc as the display area in the selected state. The display area Abc displays the single-sided/double-sided mode "single-sided document to single-sided copy". It is assumed that the user performed a double-tap operation. The touch screen 21 displays the single-sided/double-sided setting image Imf with the display area Abca displaying the single-sided/double-sided mode "single-sided document to single-sided copy" as the display area in the selected state based on the double-tap operation. The touch screen 21 may display the single-sided/double-sided setting image Imf instead of the copy setting image Imb. The touch screen 21 may display the single-sided/double-sided setting image Imf superimposed on the copy setting image Imb. It is assumed that the user performed a downward swipe operation. Based on the downward swipe operation, the touch screen 21 changes and displays the display area in the selected state from the display area Abca to the display area Abcb for displaying the single-sided/double-sided mode "double-sided document to double-sided copy". It is assumed that the user performed a double-tap operation. The touch screen 21 displays the copy setting image Imb with the display area Abc as the display area in the selected state based on the double-tap operation. The display area Abc displays the single-sided/double-sided mode "double-sided document to double-sided copy".

Figure 8:
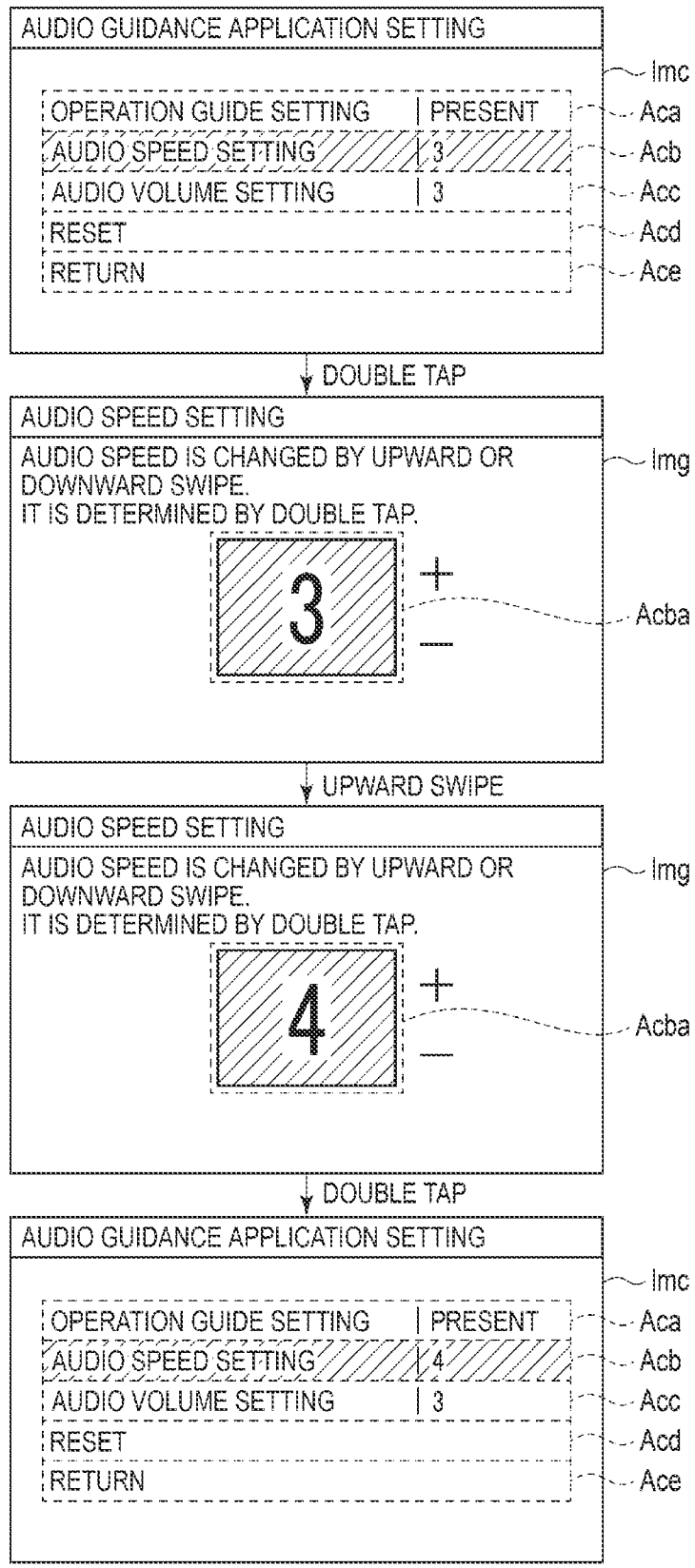
FIG. 8 is a diagram showing an example of image transition associated with the audio speed setting displayed on the touch screen.

FIG. 8 is a diagram showing an example of the transition of images displayed on the touch screen 21 associated with the audio speed setting. FIG. 8 shows an example in which the user changes the audio speed from 3 to 4.

The touch screen 21 displays the audio guidance setting image Imc with the display area Acb as the display area in the selected state. The display area Acb displays the audio speed "3". It is assumed that the user performed a double-tap operation. The touch screen 21 displays the audio speed setting image Img with the display area Acba as the display area in the selected state based on the double-tap operation. The touch screen 21 may display the audio speed setting image Img instead of the audio guidance setting image Imc. The touch screen 21 may display the audio speed setting image Img superimposed on the audio guidance setting image Imc. The display area Acba displays the audio speed "3" displayed in the display area Acb before the audio speed setting image Img is displayed. It is assumed that the user performed an upward swipe operation. Based on the upward swipe operation, the touch screen 21 displays the audio speed "4" in the display area Acba without changing the display area in the selected state from the display area Acba. It is assumed that the user performed a double-tap operation. The touch screen 21 displays the audio guidance setting image Imc with the display area Acb as the display area in the selected state based on the double-tap operation. The display area Acb displays the audio speed "4".

Since the image transition associated with the volume setting based on the user operation is the same as the image transition associated with the audio speed setting based on the user operation described with reference to FIG. 8, the descriptions thereof will be omitted.

Among the images displayed on the touch screen 21, an image in a higher hierarchy is also referred to as a first image. An image in a hierarchy lower than the first image is also referred to as a second image. If the top image Ima is the first image, the copy setting image Imb or the audio guidance setting image Imc is the second image. If the copy setting image Imb is the first image, the copy number setting image Imd, the color mode setting image Ime, or the single-sided/double-sided setting image Imf is the second image. If the audio guidance setting image Imc is the first image, the audio speed setting image Img or the volume setting image Imh is the second image.

Operation Example

Next, processing by the control circuit 11 of the image forming apparatus 1 will be described.

The processing procedure described below is merely an example, and each process may be changed or varied. In addition, with respect to the particular processing procedure described below, steps can be omitted, replaced, rearranged, and added as appropriate.

Figure 9:
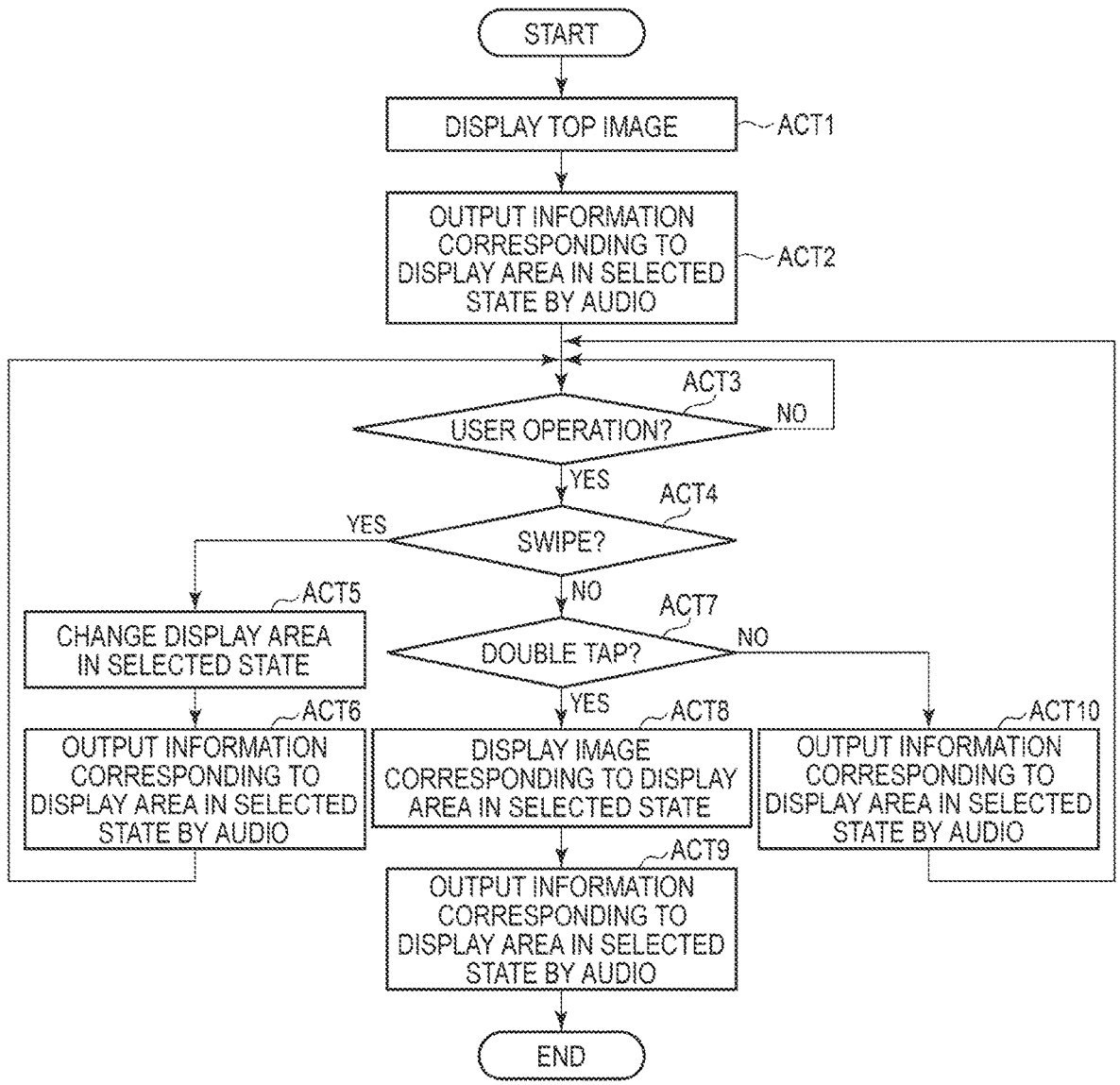
FIG. 9 is a flowchart showing an example of processing associated with a user operation on the top image displayed on the touch screen.

FIG. 9 is a flowchart showing an example of processing associated with a user operation on the top image Ima displayed on the touch screen 21.

The display control unit 112 displays the top image Ima on the touch screen 21 based on a predetermined user operation (ACT 1). Here, in the top image Ima, the display area Aa displaying "copy start" is assumed to be the display area in the selected state.

The audio control unit 113 performs control so that information corresponding to the display area in the selected state is output by audio along with the display of the top image Ima based on a predetermined user operation (ACT 2). In ACT 2, for example, the audio control unit 113 performs control so that "copy start, select" is output by audio as information corresponding to the display area Aa, which is the display area in the selected state.

The detection unit 111 waits for a user operation (ACT 3). If the detection unit 111 does not detect a user operation (ACT 3, NO), the detection unit 111 continues the process of ACT 3. If the detection unit 111 detects a user operation (ACT 3, YES), the process transitions from ACT 3 to ACT 4. The detection unit 111 detects whether the user operation is a swipe operation (ACT 4). If the user operation is a swipe operation (ACT 4, YES), the process transitions from ACT 4 to ACT 5. If the user operation is not a swipe operation (ACT 4, NO), the process transitions from ACT 4 to ACT 7.

The display control unit 112 changes and displays the display area in the selected state from the first display area to the second display area among the plurality of display areas Aa to Ad based on the swipe operation (ACT 5). In ACT 5, for example, the display control unit 112 switches and displays the display area in the selected state among the plurality of display areas Aa to Ad for each swipe operation.

A downward swipe operation if the top image Ima is displayed on the touch screen 21 is exemplified. Based on the downward swipe operation, the display control unit 112 changes and displays the display area in the selected state from the first display area to the second display area adjacent to the first display area along the first direction. First, a case where the first display area is a display area other than the last display area among the plurality of display areas Aa to Ad will be described. In this example, the display control unit 112 changes and displays the display area in the selected state from the first display area to the second display area adjacent to the first display area along the first direction based on the downward swipe operation. For example, in the top image Ima, the display area Aa displaying "copy start" is assumed to be the display area in the selected state. Based on the downward swipe operation, the display control unit 112 changes and displays the display area in the selected state from the display area Aa to the display area Ab adjacent to the display area Aa along the first direction. Next, a case where the first display area is the last display area will be described. In this example, the display control unit 112 changes and displays the display area in the selected state from the first display area to the second display area, which is the leading display area, based on the downward swipe operation. The leading display area is a display area that is virtually adjacent to the last display area along the first direction. For example, in the top image Ima, the display area Ad displaying "terminate audio guidance" is assumed to be the display area in the selected state. Based on the downward swipe operation, the display control unit 112 changes and displays the display area in the selected state from the display area Ad to the display area Aa, which is the leading display area.

An upward swipe operation if the top image Ima is displayed on the touch screen 21 is exemplified. Based on the upward swipe operation, the display control unit 112 changes and displays the display area in the selected state from the first display area to the second display area adjacent to the first display area along the second direction. First, a case where the first display area is a display area other than the leading display area among the plurality of display areas Aa to Ad will be described. In this example, the display control unit 112 changes and displays the display area in the selected state from the first display area to the second display area adjacent to the first display area along the second direction based on the upward swipe operation. For example, in the top image Ima, the display area Ad displaying "terminate audio guidance" is assumed to be the display area in the selected state. Based on the upward swipe operation, the display control unit 112 changes and displays the display area in the selected state from the display area Ad to the display area Ac adjacent to the display area Ad along the second direction. Next, a case where the first display area is the leading display area will be described. In this example, the display control unit 112 changes and displays the display area in the selected state from the first display area to the second display area, which is the last display area, based on the upward swipe operation. The last display area is a display area that is virtually adjacent to the leading display area along the second direction. For example, in the top image Ima, the display area Aa displaying "copy start" is assumed to be the display area in the selected state. Based on the upward swipe operation, the display control unit 112 changes and displays the display area in the selected state from the display area Aa to the display area Ad, which is the last display area.

The audio control unit 113 performs control so that information corresponding to the display area in the selected state is output by audio based on a swipe operation (ACT 6). In ACT 6, for example, the audio control unit 113 performs control so that information corresponding to the display area in the selected state is output by audio as the display area in the selected state is changed based on the swipe operation. For example, in the top image Ima, the display control unit 112 is assumed to change and display the display area in the selected state from the display area Aa to the display area Ab based on a downward swipe operation. In this example, the audio control unit 113 performs control so that "copy setting, select" is output by audio as information corresponding to the display area Ab, which is the display area in the selected state.

The detection unit 111 detects whether or not the user operation is a double-tap operation (ACT 7). If the user operation is a double-tap operation (ACT 7, YES), the process transitions from ACT 7 to ACT 8. If the user operation is not a double-tap operation (ACT 7, NO), the process transitions from ACT 7 to ACT 10. If the user operation is not a double-tap operation, the user operation is assumed to be a tap operation.

The display control unit 112 displays an image corresponding to the display area in the selected state in the top image Ima on the touch screen 21 based on the double-tap operation (ACT 8).

The audio control unit 113 performs control so that information corresponding to the display area in the selected state is output by audio based on a double-tap operation (ACT 9). In ACT 9, for example, the audio control unit 113 performs control so that information corresponding to the display area in the selected state in the image displayed on the touch screen 21 is output by audio along with the display of the image based on the double-tap operation.

The audio control unit 113 performs control so that information corresponding to the display area in the selected state in the top image Ima is output by audio based on a tap operation (ACT 10).

Figure 10:
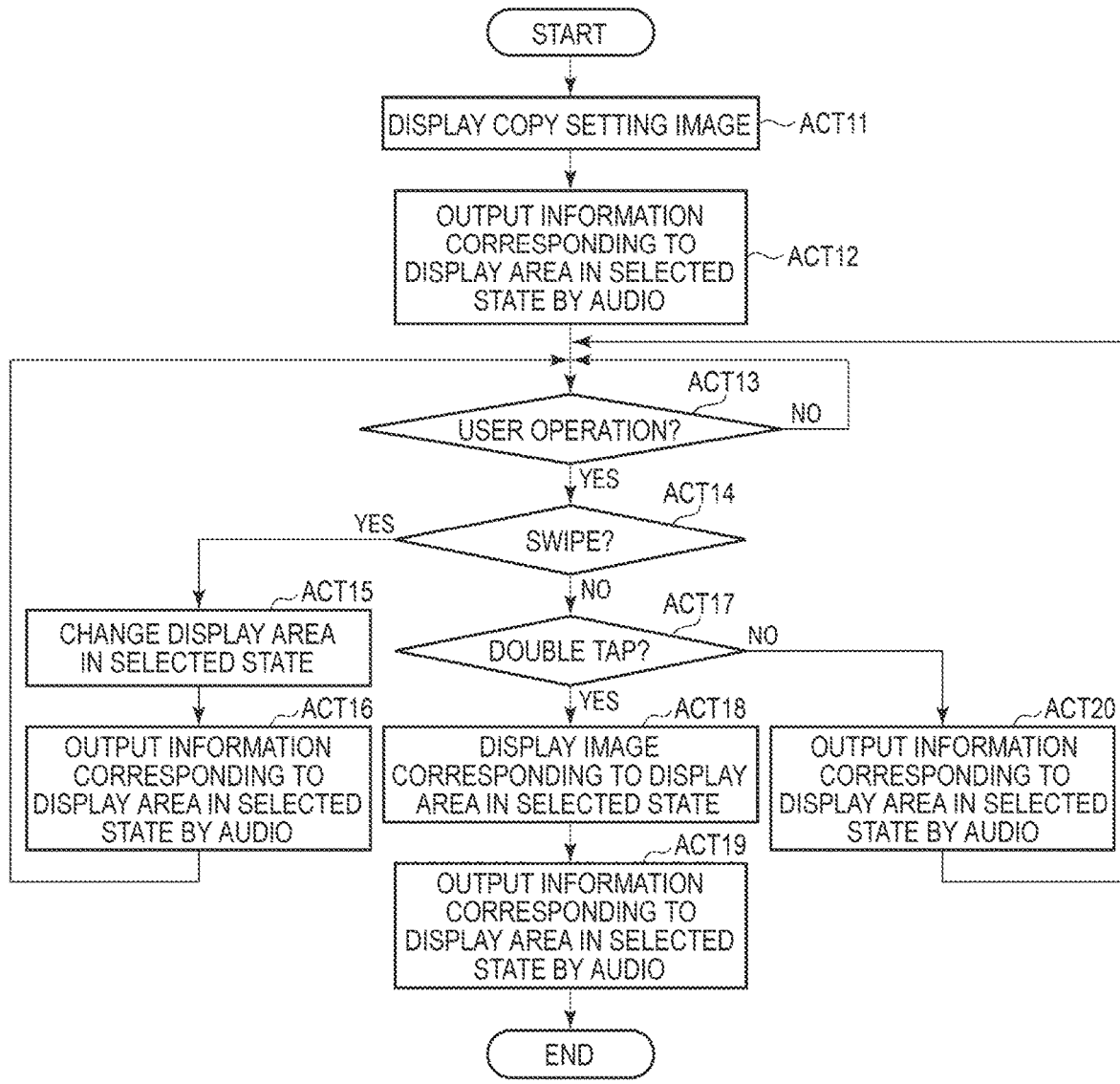
FIG. 10 is a flowchart showing an example of processing associated with a user operation on the copy setting image displayed on the touch screen.

FIG. 10 is a flowchart showing an example of processing associated with a user operation on the copy setting image Imb displayed on the touch screen 21.

Here, it is assumed that the user performed a double-tap operation when the display area Ab displaying "copy setting" in the top image Ima was the display area in the selected state.

The display control unit 112 displays the copy setting image Imb on the touch screen 21 with the display area Aba as the display area in the selected state based on a double-tap operation (ACT 11).

The audio control unit 113 performs control so that information corresponding to the display area in the selected state is output by audio based on the double-tap operation (ACT 12). In ACT 12, for example, the audio control unit 113 performs control so that information corresponding to the display area in the selected state in the copy setting image Imb is output by audio as the copy setting image Imb is displayed based on the double-tap operation. For example, it is assumed that the display area Aba displays "number of copies" indicating the copy number setting item and the number of copies "1". In this example, the audio control unit 113 performs control so that "copy setting, copy number setting, setting value, 1" is output by audio as information corresponding to the display area Aba, which is the display area in the selected state.

The detection unit 111 waits for a user operation (ACT 13). If the detection unit 111 does not detect a user operation (ACT 13, NO), the detection unit 111 continues the process of ACT 13. If the detection unit 111 detects a user operation (ACT 13, YES), the process transitions from ACT 13 to ACT 14. The detection unit 111 detects whether the user operation is a swipe operation (ACT 14). If the user operation is a swipe operation (ACT 14, YES), the process transitions from ACT 14 to ACT 15. If the user operation is not a swipe operation (ACT 14, NO), the process transitions from ACT 14 to ACT 17.

The display control unit 112 changes and displays the display area in the selected state from the first display area to the second display area among the plurality of display areas Aba to Abf based on the swipe operation (ACT 15). In ACT 15, for example, the display control unit 112 switches and displays the display areas in the selected states one by one among the plurality of display areas Aba to Abf for each swipe operation.

The process of ACT 15 based on the downward swipe operation or the upward swipe operation if the copy setting image Imb is displayed on the touch screen 21 is the same as the process of ACT 5. Based on the downward swipe operation, the display control unit 112 changes and displays the display area in the selected state from the first display area to the second display area adjacent to the first display area along the first direction. For example, based on the downward swipe operation, the display control unit 112 changes and displays the display area in the selected state from the display area Aba to the display area Abb adjacent to the display area Aba, along the first direction. Based on the downward swipe operation, the display control unit 112 changes and displays the display area in the selected state from the display area Abf, which is the last display area, to the display area Aba, which is the leading display area. Based on the upward swipe operation, the display control unit 112 changes and displays the display area in the selected state from the first display area to the second display area adjacent to the first display area, along the second direction. For example, based on the upward swipe operation, the display control unit 112 changes and displays the display area in the selected state from the display area Abf to the display area Abe adjacent to the display area Abf, along the second direction. Based on the upward swipe operation, the display control unit 112 changes and displays the display area in the selected state from the display area Aba, which is the leading display area, to the display area Abf, which is the last display area.

The audio control unit 113 performs control so that information corresponding to the display area in the selected state is output by audio based on a swipe operation (ACT 16). In ACT 16, for example, the audio control unit 113 performs control so that information corresponding to the display area in the selected state is output by audio as the display area in the selected state is changed based on the swipe operation. For example, in the copy setting image Imb, the display control unit 112 is assumed to change and display the display area in the selected state from the display area Aba to the display area Abb based on the downward swipe operation. It is assumed that the display area Abb displays "color mode" indicating color mode setting items and color mode "full color". In this example, the audio control unit 113 performs control so that "color mode setting, setting value, full color" is output by audio as information corresponding to the display area Abb which is the display area in the selected state.

The detection unit 111 detects whether or not the user operation is a double-tap operation (ACT 17). If the user operation is a double-tap operation (ACT 17, YES), the process transitions from ACT 17 to ACT 18. If the user operation is not a double-tap operation (ACT 17, NO), the process transitions from ACT 17 to ACT 20. If the user operation is not a double-tap operation, it is assumed that the user operation is a tap operation.

The display control unit 112 displays on the touch screen 21 an image corresponding to the display area in the selected state in the copy setting image Imb based on the double-tap operation (ACT 18).

The audio control unit 113 performs control so that information corresponding to the display area in the selected state is output by audio based on the double-tap operation (ACT 19). In ACT 19, for example, the audio control unit 113 performs control so that information corresponding to the display area in the selected state in the image displayed on the touch screen 21 is output by audio along with the display of the image based on the double-tap operation.

The audio control unit 113 performs control so that information corresponding to the display area in the selected state in the copy setting image Imb is output by audio based on a tap operation (ACT 20). In ACT 20, for example, the audio control unit 113 performs control so that, for each tap operation by the user, information corresponding to the same display area in the selected state is repeatedly output by audio. This allows the user to repeatedly check the display contents in the display area in the selected state with a simple operation.

Figure 11:
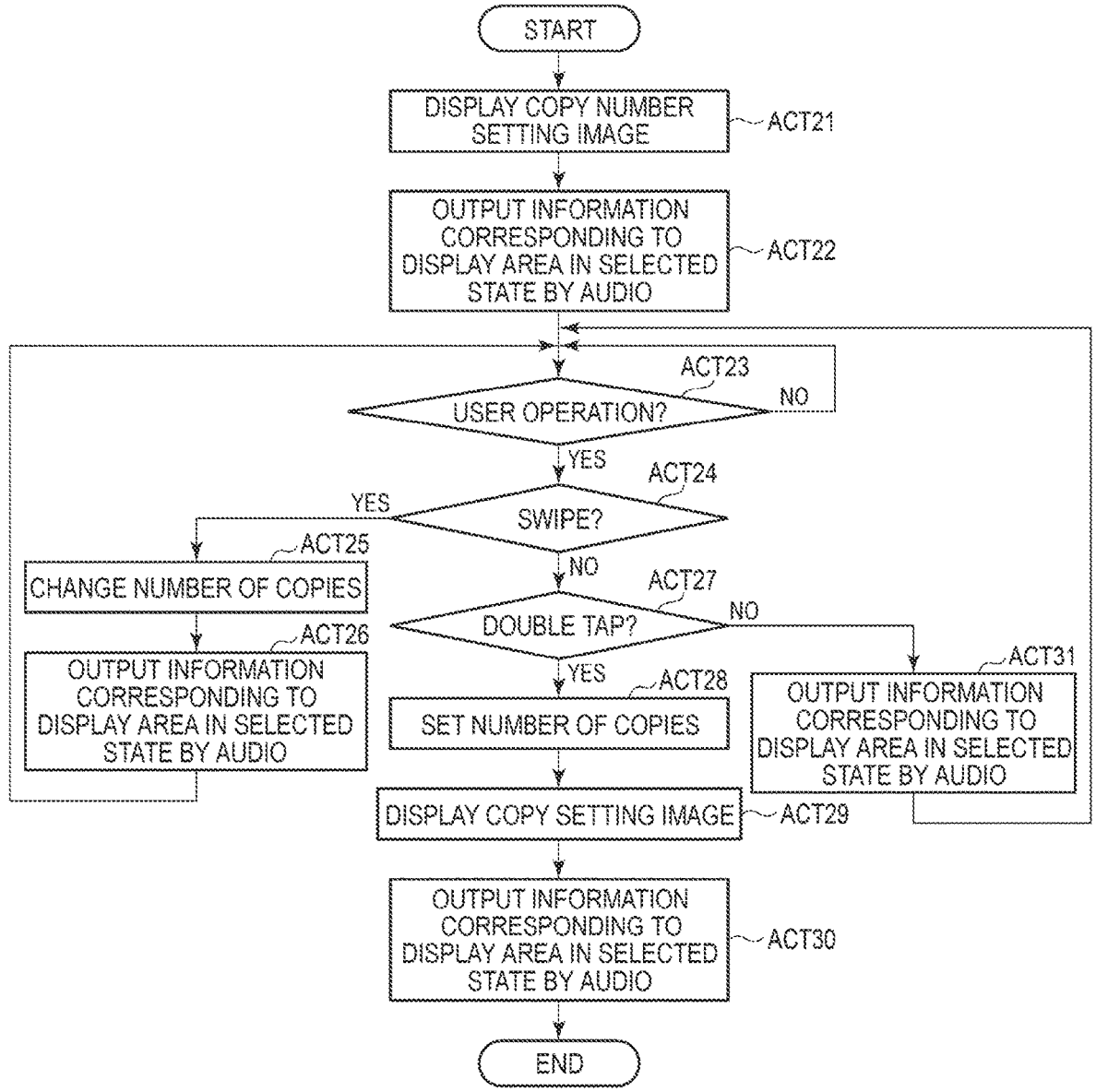
FIG. 11 is a flowchart showing an example of processing associated with a user operation on a copy number setting image displayed on the touch screen.

FIG. 11 is a flow chart showing an example of processing associated with a user operation on the copy number setting image Imd displayed on the touch screen 21.

Here, it is assumed that the user performed a double-tap operation when the display area Aba was the display area in the selected state in the copy setting image Imb. It is assumed that the display area Aba displays the number of copies "1" initially.

The display control unit 112 displays the copy number setting image Imd on the touch screen 21 with the display area Abaa as the display area in the selected state based on the double-tap operation (ACT 21). The display area Abaa displays the number of copies "1" as was displayed in the display area Aba before the copy number setting image Imd was displayed.

The audio control unit 113 performs control so that information corresponding to the display area in the selected state is output by audio based on a double-tap operation (ACT 22). In ACT 22, for example, the audio control unit 113 outputs information corresponding to the display area in the selected state of the copy number setting image Imd by audio as the copy number setting image Imd is displayed based on the double-tap operation. The audio control unit 113 performs control so that the number of copies is output by audio as information corresponding to the display area in the selected state. For example, the audio control unit 113 performs control so that "copy number setting, number of copies, 1" is output by audio as information corresponding to the display area Abaa, which is the display area in the selected state.

The detection unit 111 waits for a user operation (ACT 23). If the detection unit 111 does not detect a user operation (ACT 23, NO), the detection unit 111 continues the process of ACT 23. If the detection unit 111 detects a user operation (ACT 23, YES), the process transitions from ACT 23 to ACT 24. The detection unit 111 detects whether the user operation is a swipe operation (ACT 24). If the user operation is a swipe operation (ACT 24, YES), the process transitions from ACT 24 to ACT 25. If the user operation is not a swipe operation (ACT 24, NO), the process transitions from ACT 24 to ACT 27.

Based on the swipe operation, the display control unit 112 changes and displays the number of copies in the display area Abaa without changing the display area in the selected state from the display area Abaa (ACT 25). In ACT 25, for example, the display control unit 112 changes and displays the number of copies by one in the display area Abaa for each swipe operation.

A downward swipe operation if the copy number setting image Imd is displayed on the touch screen 21 is exemplified. The display control unit 112 reduces and displays the number of copies by 1 in the display area Abaa based on the downward swipe operation. For example, in the copy number setting image Imd, it is assumed that the display area Abaa displays the number of copies "5". Based on the downward swipe operation, the display control unit 112 displays "4" obtained by subtracting 1 from "5" in the display area Abaa as the number of copies.

An upward swipe operation if the copy number setting image Imd is displayed on the touch screen 21 is exemplified. The display control unit 112 increases and displays the number of copies by 1 in the display area Abaa based on the upward swipe operation. For example, in the copy number setting image Imd, it is assumed that the display area Abaa displays the number of copies "1". Based on the upward swipe operation, the display control unit 112 displays "2", which is incremented by 1 from "1" as the number of copies in the display area Abaa.

The audio control unit 113 performs control so that information corresponding to the display area in the selected state is output by audio based on the swipe operation (ACT 26). In ACT 26, for example, the audio control unit 113 performs control so that information corresponding to the display area in the selected state is output by audio if the number of copies is changed in the display area Abaa based on the swipe operation. The audio control unit 113 performs control so that the number of copies is output by audio as information corresponding to the display area in the selected state. For example, it is assumed that the display area Abaa displays "2", which is incremented by 1 from "1", as the number of copies based on the swipe operation. The display area Abaa remains as the display area in the selected state before and after the swipe operation. In this example, the audio control unit 113 performs control so that "number of copies, 2" is output by audio as information corresponding to the display area Abaa, which is the display area in the selected state. In this manner, the audio control unit 113 can perform control so that the changed number of copies is output by audio as information corresponding to the display area in the selected state each time the number of copies is changed.

The detection unit 111 detects whether the user operation is a double-tap operation (ACT 27). If the user operation is a double-tap operation (ACT 27, YES), the process transitions from ACT 27 to ACT 28. If the user operation is not a double-tap operation (ACT 27, NO), the process transitions from ACT 27 to ACT 31. If the user operation is not a double-tap operation, the user operation is assumed to be a tap operation.

The setting unit 114 sets the number of copies displayed in the display area Abaa for the copy number setting item based on the double-tap operation (ACT 28). For example, if the copy number setting image Imd is displayed on the touch screen 21, it is assumed that the display area Abaa displays the number of copies "2". In this example, the setting unit 114 sets the number of copies "2" for the copy number setting item based on the double-tap operation.

The display control unit 112 displays the copy setting image Imb on the touch screen 21 with the display area Aba as the display area in the selected state based on the double-tap operation (ACT 29). For example, the display area Aba of the copy setting image Imb displays the number of copies "2" set by the setting unit 114. The display area Aba updates and displays the number of copies from "1" to "2". In this manner, the display area Aba can update and display the number of copies each time the number of copies is set by the setting unit 114.

The audio control unit 113 performs control so that information corresponding to the display area in the selected state is output by audio based on the double-tap operation (ACT 30). In ACT 30, for example, the audio control unit 113 performs control so that information corresponding to the display area in the selected state in the copy setting image Imb is output by audio if the copy setting image Imb is displayed based on the double-tap operation. The audio control unit 113 performs control so that the copy number setting item is output by audio as information corresponding to the display area in the selected state. The audio control unit 113 performs control so that the number of copies is output by audio as information corresponding to the display area in the selected state. If the display area Aba displays the number of copies "2", the audio control unit 113 performs control so that "copy setting, copy number setting, setting value, 2" is output by audio as information corresponding to the display area Aba, which is the display area in the selected state. In this manner, the audio control unit 113 can perform control so that the set number of copies is output by audio as information corresponding to the display area in the selected state each time the number of copies is set.

The audio control unit 113 performs control so that information corresponding to the display area in the selected state in the copy number setting image Imd is output by audio based on the tap operation (ACT 31). The process of ACT 31 may be similar to the process of ACT 20.

Figure 12:
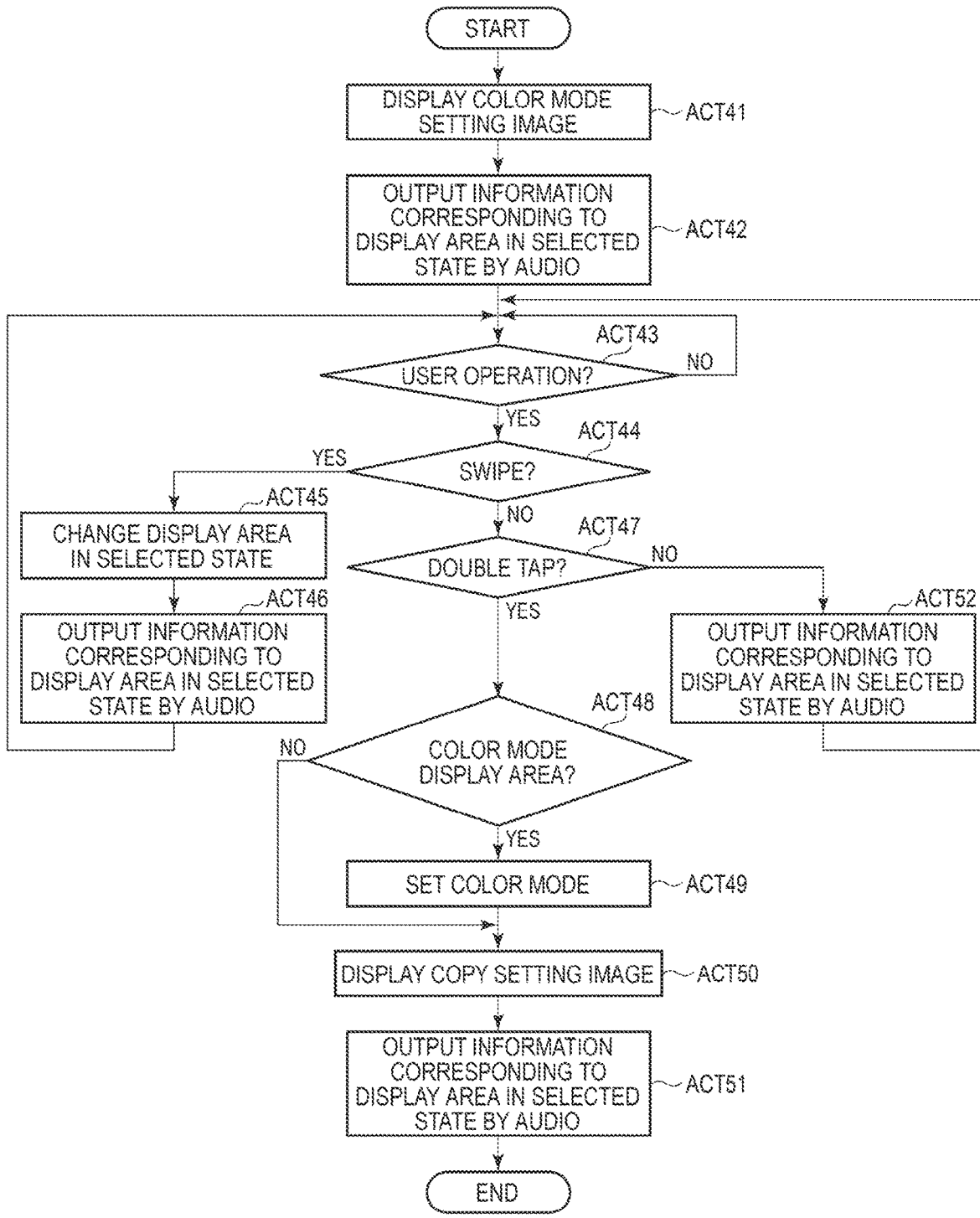
FIG. 12 is a flowchart showing an example of processing associated with a user operation on a color mode setting image displayed on the touch screen.

FIG. 12 is a flowchart showing an example of processing associated with a user operation on the color mode setting image Ime displayed on the touch screen 21.

Here, it is assumed that the user performed a double-tap operation when the display area Abb was the display area in the selected state in the copy setting image Imb. It is assumed that the display area Abb displays the color mode "full color".

Based on the double-tap operation, the display control unit 112 displays the color mode setting image Ime on the touch screen 21 with the display area displaying the set color mode as the display area in the selected state (ACT 41). For example, the display control unit 112 displays the color mode setting image Ime on the touch screen 21 with the display area Abba displaying the color mode "full color" as the display area in the selected state.

The audio control unit 113 performs control so that information corresponding to the display area in the selected state is output by audio based on the double-tap operation (ACT 42). In ACT 42, for example, the audio control unit 113 performs control so that information corresponding to the display area in the selected state in the color mode setting image Ime is output by audio if the color mode setting image Ime is displayed based on the double-tap operation. The audio control unit 113 performs control so that the color mode is output by audio as information corresponding to the display area in the selected state. For example, the audio control unit 113 performs control so that "color mode setting, full color, select" is output by audio as information corresponding to the display area Abba which is the display area in the selected state.

The detection unit 111 waits for a user operation (ACT 43). If the detection unit 111 does not detect a user operation (ACT 43, NO), the detection unit 111 continues the process of ACT 43. If the detection unit 111 detects a user operation (ACT 43, YES), the process transitions from ACT 43 to ACT 44. The detection unit 111 detects whether the user operation is a swipe operation (ACT 44). If the user operation is a swipe operation (ACT 44, YES), the process transitions from ACT 44 to ACT 45. If the user operation is not a swipe operation (ACT 44, NO), the process transitions from ACT 44 to ACT 47.

The display control unit 112 changes and displays the display area in the selected state from the first display area to the second display area among the plurality of display areas Abba to Abbd based on the swipe operation (ACT 45). In ACT 45, for example, the display control unit 112 switches and displays the display area in the selected states one by one among the plurality of display areas Abba to Abbd for each swipe operation.

The process of ACT 45 based on the downward swipe operation or the upward swipe operation if the color mode setting image Ime is displayed on the touch screen 21 is the same as the process of ACT 5. Based on the downward swipe operation, the display control unit 112 changes and displays the display area in the selected state along the first direction from the first display area to the second display area adjacent to the first display area. For example, based on the downward swipe operation, the display control unit 112 changes and displays the display area in the selected state along the first direction from the display area Abba to the display area Abbb adjacent to the display area Abba. Based on the downward swipe operation, the display control unit 112 changes and displays the display area in the selected state from the display area Abbd, which is the last display area, to the display area Abba, which is the leading display area. Based on the upward swipe operation, the display control unit 112 changes and displays the display area in the selected state along the second direction from the first display area to the second display area adjacent to the first display area. For example, based on the upward swipe operation, the display control unit 112 changes and displays the display area in the selected state along the second direction from the display area Abbd to the display area Abbc adjacent to the display area Abbd. Based on the upward swipe operation, the display control unit 112 changes and displays the display area in the selected state from the display area Abba, which is the leading display area, to the display area Abbd, which is the last display area.

The audio control unit 113 performs control so that information corresponding to the display area in the selected state is output by audio based on the swipe operation (ACT 46). In ACT 46, for example, the audio control unit 113 performs control so that information corresponding to the display area in the selected state is output by audio if the display area in the selected state is changed based on the swipe operation. The audio control unit 113 performs control so that the color mode is output by audio as information corresponding to the display area in the selected state. For example, in the color mode setting image Ime, the display control unit 112 changes and displays the display area in the selected state from the display area Abba to the display area Abbb based on the downward swipe operation. In this example, the audio control unit 113 performs control so that "black and white selection" is output by audio as information corresponding to the display area Abbb, which is the display area in the selected state.

The detection unit 111 detects whether the user operation is a double-tap operation (ACT 47). If the user operation is a double-tap operation (ACT 47, YES), the process transitions from ACT 47 to ACT 48. If the user operation is not a double-tap operation (ACT 47, NO), the process transitions from ACT 47 to ACT 52. If the user operation is not a double-tap operation, the user operation is assumed to be a tap operation.

The detection unit 111 detects whether or not the display area in the selected state is a color mode display area at the timing of the double-tap operation (ACT 48). The color mode display area is the display area Abba, the display area Abbb, or the display area Abbc. If the display area in the selected state is a color mode display area (ACT 48, YES), the process transitions from ACT 48 to ACT 49. If the display area in the selected state is not a color mode display area (ACT 48, NO), the process transitions from ACT 48 to ACT 50. The case where the display area in the selected state is not a color mode display area is the case where the display area in the selected state is the display area Abbd displaying "cancel".

The setting unit 114 sets the color mode displayed in one of the plurality of display areas Abba to Abbc, which is the display area in the selected state, for the color mode setting item based on the double-tap operation (ACT 49). For example, it is assumed that the display area Abbb displaying the color mode "black and white" is the display area in the selected state. In this example, the setting unit 114 sets the color mode "black and white" for the color mode setting item based on the double-tap operation.

The display control unit 112 displays the copy setting image Imb on the touch screen 21 with the display area Abb as the display area in the selected state based on the double-tap operation (ACT 50). For example, the display area Abb of the copy setting image Imb displays the color mode "black and white" set by the setting unit 114. The display area Abb is displayed by updating the color mode from "full color" to "black and white". In this manner, the display area Abb can update and display the color mode each time the setting unit 114 sets the color mode.

The audio control unit 113 performs control so that information corresponding to the display area in the selected state is output by audio based on the double-tap operation (ACT 51). In ACT 51, for example, if the copy setting image Imb is displayed based on the double-tap operation, the audio control unit 113 performs control so that information corresponding to the display area in the selected state in the copy setting image Imb is output by audio. The audio control unit 113 performs control so that the color mode setting item is output by audio as information corresponding to the display area in the selected state. The audio control unit 113 performs control so that the color mode is output by audio as information corresponding to the display area in the selected state. If the display area Abb displays the color mode "black and white", the audio control unit 113 performs control so that "copy setting, color mode setting, setting value, black and white" is output by audio as information corresponding to the display area Abb, which is the display area in the selected state. In this manner, the audio control unit 113 can perform control so that the set color mode is output by audio as information corresponding to the display area in the selected state for each color mode setting.

The audio control unit 113 performs control so that information corresponding to the display area in the selected state in the color mode setting image Ime is output by audio based on the tap operation (ACT 52). The process of ACT 52 may be similar to the process of ACT 20.

Figure 13:
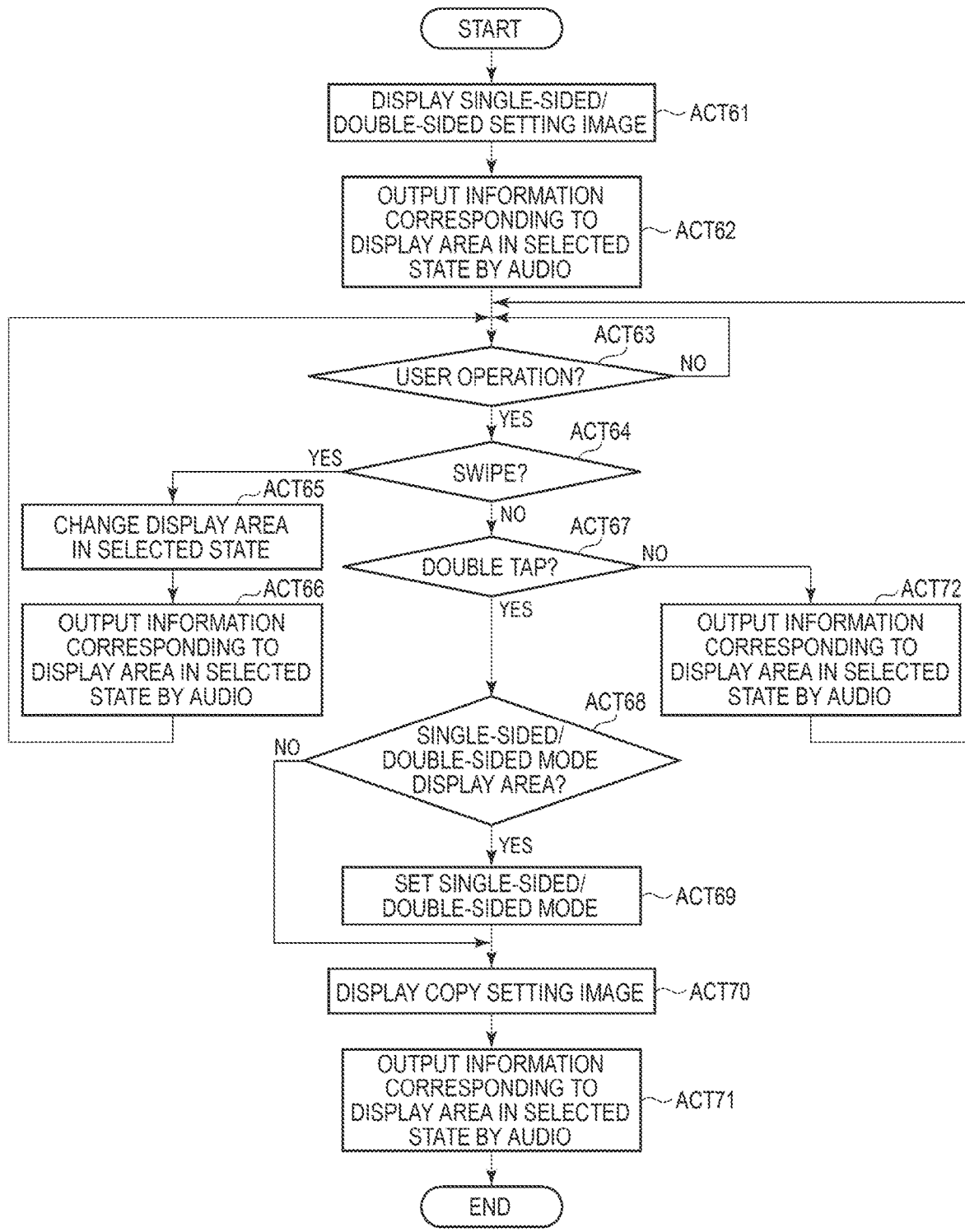
FIG. 13 is a flowchart showing an example of processing associated with a user operation on a single-sided/double-sided setting image displayed on the touch screen.

FIG. 13 is a flowchart showing an example of processing associated with a user operation on the single-sided/double-sided setting image Imf displayed on the touch screen 21.

Here, it is assumed that the user performed a double-tap operation when the display area Abc was the display area in the selected state in the copy setting image Imb. It is assumed that the display area Abc displays the single-sided/double-sided mode "single-sided document to single-sided copy".

The display control unit 112 displays the single-sided/double-sided setting image Imf on the touch screen 21 with the display area displaying the set single-sided/double-sided mode as the display area in the selected state based on the double-tap operation (ACT 61). For example, the display control unit 112 displays the single-sided/double-sided setting image Imf on the touch screen 21 with the display area Abca displaying the single-sided/double-sided mode "single-sided document to single-sided copy" as the display area in the selected state.

The audio control unit 113 performs control so that information corresponding to the display area in the selected state is output by audio based on the double-tap operation (ACT 62). In ACT 62, for example, the audio control unit 113 performs control so that information corresponding to the display area in the selected state of the single-sided/double-sided setting image Imf is output by audio if the single-sided/double-sided setting image Imf is displayed based on the double-tap operation. The audio control unit 113 performs control so that single-sided/double-sided mode is output by audio as information corresponding to the display area in the selected state. For example, the audio control unit 113 performs control so that "single-sided/double-sided setting, single-sided document to single-sided copy, select" is output by audio as information corresponding to the display area Abca, which is the display area in the selected state.

The detection unit 111 waits for a user operation (ACT 63). If the detection unit 111 does not detect a user operation (ACT 63, NO), the detection unit 111 continues the process of ACT 63. If the detection unit 111 detects a user operation (ACT 63, YES), the process transitions from ACT 63 to ACT 64. The detection unit 111 detects whether the user operation is a swipe operation (ACT 64). If the user operation is a swipe operation (ACT 64, YES), the process transitions from ACT 64 to ACT 65. If the user operation is not a swipe operation (ACT 64, NO), the process transitions from ACT 64 to ACT 67.

The display control unit 112 changes and displays the display area in the selected state from the first display area to the second display area among the plurality of display areas Abca to Abcc based on the swipe operation (ACT 65). In ACT 65, for example, the display control unit 112 switches and displays the display area in the selected states one by one among the plurality of display areas Abca to Abcc for each swipe operation.

The process of ACT 65 based on the downward swipe operation or the upward swipe operation if the single-sided/double-sided setting image Imf is displayed on the touch screen 21 is the same as the process of ACT 5. Based on the downward swipe operation, the display control unit 112 changes and displays the display area in the selected state along the first direction from the first display area to the second display area adjacent to the first display area. For example, based on the downward swipe operation, the display control unit 112 changes and displays the display area in the selected state along the first direction from the display area Abca to the display area Abcb adjacent to the display area Abca. Based on the downward swipe operation, the display control unit 112 changes and displays the display area in the selected state from the display area Abcc, which is the last display area, to the display area Abca, which is the leading display area. Based on the upward swipe operation, the display control unit 112 changes and displays the display area in the selected state along the second direction from the first display area to the second display area adjacent to the first display area. For example, based on the upward swipe operation, the display control unit 112 changes and displays the display area in the selected state along the second direction from the display area Abcc to the display area Abcb adjacent to the display area Abcc. Based on the upward swipe operation, the display control unit 112 changes and displays the display area in the selected state from the display area Abca, which is the leading display area, to the display area Abcc, which is the last display area.

The audio control unit 113 performs control so that information corresponding to the display area in the selected state is output by audio based on the swipe operation (ACT 66). In ACT 66, for example, the audio control unit 113 performs control so that information corresponding to the display area in the selected state is output by audio as the display area in the selected state is changed based on the swipe operation. The audio control unit 113 performs control so that single-sided/double-sided mode is output by audio as information corresponding to the display area in the selected state. For example, in the single-sided/double-sided setting image Imf, it is assumed that the display control unit 112 changes and displays the display area in the selected state from the display area Abca to the display area Abcb based on the downward swipe operation. In this example, the audio control unit 113 performs control so that "double-sided document to double-sided copy, select" is output by audio as the information corresponding to the display area Abcb, which is the display area in the selected state.

The detection unit 111 detects whether the user operation is a double-tap operation (ACT 67). If the user operation is a double-tap operation (ACT 67, YES), the process transitions from ACT 67 to ACT 68. If the user operation is not a double-tap operation (ACT 67, NO), the process transitions from ACT 67 to ACT 72. If the user operation is not a double-tap operation, the user operation is assumed to be a tap operation.

At the timing of the double-tap operation, the detection unit 111 detects whether the display area in the selected state is a display area of the single-sided/double-sided mode (ACT 68). The display area in the single-sided/double-sided mode is the display area Abca or the display area Abcb. If the display area in the selected state is a display area of the single-sided/double-sided mode (ACT 68, YES), the process transitions from ACT 68 to ACT 69. If the display area in the selected state is not a display area of the single-sided/double-sided mode (ACT 68, NO), the process transitions from ACT 68 to ACT 70. If the display area in the selected state is not a display area of the single-sided/double-sided mode, the display area in the selected state is the display area Abcc displaying "cancel".

The setting unit 114 sets the single-sided/double-sided mode displayed in one of the plurality of display areas Abca to Abcb, which is the display area in the selected state, for the single-sided/double-sided setting item based on the double-tap operation (ACT 69). For example, it is assumed that the display area Abcb displaying the single-sided/double-sided mode "double-sided document to double-sided copy" is the display area in the selected state. In this example, the setting unit 114 sets the single-sided/double-sided mode "double-sided document to double-sided copy" for the single-sided/double-sided setting item based on the double-tap operation.

The display control unit 112 displays the copy setting image Imb on the touch screen 21 with the display area Abc as the display area in the selected state based on the double-tap operation (ACT 70). For example, the display area Abc of the copy setting image Imb displays the single-sided/double-sided mode "double-sided document to double-sided copy" set by the setting unit 114. The display area Abc updates and displays the single-sided/double-sided mode from "single-sided document to single-sided copy" to "double-sided document to double-sided copy". In this manner, the display area Abc can update and display the single-sided/double-sided mode each time the single-sided/double-sided mode is set by the setting unit 114.

The audio control unit 113 performs control so that information corresponding to the display area in the selected state is output by audio based on the double-tap operation (ACT 71). In ACT 71, for example, the audio control unit 113 performs control so that information corresponding to the display area in the selected state in the copy setting image Imb is output by audio if the copy setting image Imb is displayed based on the double-tap operation. The audio control unit 113 performs control so that the single-sided/double-sided setting item is output by audio as information corresponding to the display area in the selected state. The audio control unit 113 performs control so that single-sided/double-sided mode is output by audio as information corresponding to the display area in the selected state. If the display area Abc displays the single-sided/double-sided mode "double-sided document to double-sided copy", the audio control unit 113 performs control so that "copy setting, single-sided/double-sided setting, setting value, double-sided document to double-sided copy" is output by audio as information corresponding to the display area Abc, which is the display area in the selected state. In this manner, the audio control unit 113 can perform control so that the set single-sided/double-sided mode is output by audio as information corresponding to the display area in the selected state for each single-sided/double-sided mode setting.

The audio control unit 113 performs control so that information corresponding to the display area in the selected state in the single-sided/double-sided setting image Imf is output by audio based on the tap operation (ACT 72). The process of ACT 72 may be similar to the process of ACT 20.

Figure 14:
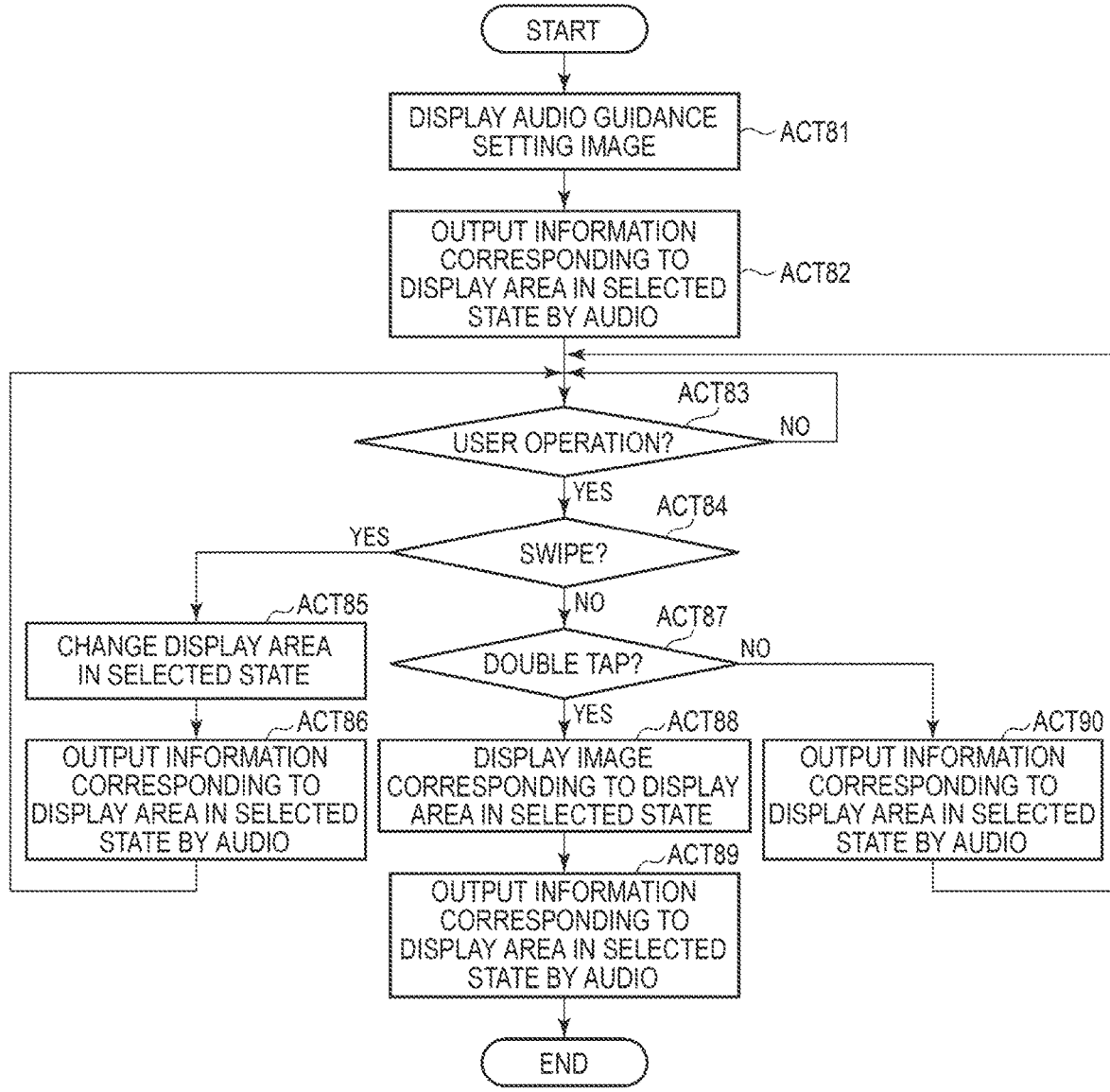
FIG. 14 is a flowchart showing an example of processing associated with a user operation on an audio guidance setting image displayed on the touch screen.

FIG. 14 is a flowchart showing an example of processing associated with a user operation on the audio guidance setting image Imc displayed on the touch screen 21.

Here, it is assumed that the user performed a double-tap operation when the display area Ac displaying "audio guidance application settings" in the top image Ima was the display area in the selected state.

The display control unit 112 displays the audio guidance setting image Imc on the touch screen 21 with the display area Aca as the display area in the selected state based on the double-tap operation (ACT 81).

The audio control unit 113 performs control so that information corresponding to the display area in the selected state is output by audio based on the double-tap operation (ACT 82). In ACT 82, for example, if the audio guidance setting image Imc is displayed based on the double-tap operation, the audio control unit 113 performs control so that information corresponding to the display area in the selected state in the audio guidance setting image Imc is output by audio. For example, it is assumed that the display area Aca displays "operation guide setting" and "present" indicating operation guide setting items at startup. In this example, the audio control unit 113 performs control so that "audio guidance application setting, operation guide setting, setting value, present" is output by audio as information corresponding to the display area Aca, which is the display area in the selected state.

The detection unit 111 waits for a user operation (ACT 83). If the detection unit 111 does not detect a user operation (ACT 83, NO), the detection unit 111 continues the process of ACT 83. If the detection unit 111 detects a user operation (ACT 83, YES), the process transitions from ACT 83 to ACT 84. The detection unit 111 detects whether the user operation is a swipe operation (ACT 84). If the user operation is a swipe operation (ACT 84, YES), the process transitions from ACT 84 to ACT 85. If the user operation is not a swipe operation (ACT 84, NO), the process transitions from ACT 84 to ACT 87.

The display control unit 112 changes and displays the display area in the selected state from the first display area to the second display area among the plurality of display areas Aca to Ace based on the swipe operation (ACT 85). In ACT 85, for example, the display control unit 112 switches and displays the display area in the selected states one by one among the plurality of display areas Aca to Ace for each swipe operation.

The process of ACT 85 based on the downward swipe operation or the upward swipe operation if the audio guidance setting image Imc is displayed on the touch screen 21 is the same as the process of ACT 5. Based on the downward swipe operation, the display control unit 112 changes and displays the display area in the selected state along the first direction from the first display area to the second display area adjacent to the first display area. For example, based on the downward swipe operation, the display control unit 112 changes and displays the display area in the selected state along the first direction from the display area Aca to the display area Acb adjacent to the display area Aca. Based on the downward swipe operation, the display control unit 112 changes and displays the display area in the selected state from the display area Ace, which is the last display area, to the display area Aca, which is the leading display area. Based on the upward swipe operation, the display control unit 112 changes and displays the display area in the selected state along the second direction from the first display area to the second display area adjacent to the first display area. For example, based on the upward swipe operation, the display control unit 112 changes the display area in the selected state from the display area Ace to the display area Acd adjacent to the display area Ace along the second direction. Based on the upward swipe operation, the display control unit 112 changes and displays the display area in the selected state from the display area Aca, which is the leading display area, to the display area Ace, which is the last display area.

The audio control unit 113 performs control so that information corresponding to the display area in the selected state is output by audio based on the swipe operation (ACT 86). In ACT 86, for example, the audio control unit 113 performs control so that information corresponding to the display area in the selected state is output by audio if the display area in the selected state is changed based on the swipe operation. For example, in the audio guidance setting image Imc, it is assumed that the display control unit 112 changes and displays the display area in the selected state from the display area Aca to the display area Acb based on the downward swipe operation. It is assumed that the display area Acb displays "audio speed setting" indicating the audio speed setting item and the audio speed "3". In this example, the audio control unit 113 performs control so that "audio speed setting, setting value, 3" is output as information corresponding to the display area Acb, which is the display area in the selected state.

The detection unit 111 detects whether the user operation is a double-tap operation (ACT 87). If the user operation is a double-tap operation (ACT 87, YES), the process transitions from ACT 87 to ACT 88. If the user operation is not a double-tap operation (ACT 87, NO), the process transitions from ACT 87 to ACT 90. If the user operation is not a double-tap operation, the user operation is assumed to be a tap operation.

The display control unit 112 displays, on the touch screen 21, an image corresponding to the display area in the selected state in the audio guidance setting image Imc based on the double-tap operation (ACT 88).

The audio control unit 113 performs control so that information corresponding to the display area in the selected state is output by audio based on the double-tap operation (ACT 89). In ACT 89, for example, the audio control unit 113 performs control so that information corresponding to the display area in the selected state in the image displayed on the touch screen 21 is output by audio along with the display of the image based on the double-tap operation.

The audio control unit 113 performs control so that information corresponding to the display area in the selected state in the audio guidance setting image Imc is output by audio based on the tap operation (ACT 90). The process of ACT 90 may be similar to the process of ACT 20.

FIG. 15 is a flowchart showing an example of processing associated with a user operation on the audio speed setting image Img displayed on the touch screen 21.

Here, it is assumed that the user performed a double-tap operation when the display area Acb was the display area in the selected state in the audio guidance setting image Imc. It is assumed that the display area Acb displays the audio speed as "3".

The display control unit 112 displays the audio speed setting image Img on the touch screen 21 with the display area Acba as the display area in the selected state based on the double-tap operation (ACT 91). The display area Acba displays the audio speed "3" displayed in the display area Acb before the audio speed setting image Img is displayed.

The audio control unit 113 performs control so that information corresponding to the display area in the selected state is output by audio based on the double-tap operation (ACT 92). In ACT 92, if the audio speed setting image Img is displayed based on the double-tap operation, the audio control unit 113 performs control so that information according to the display area in the selected state in the audio speed setting image Img is output by audio. The audio control unit 113 performs control so that the audio speed is output by audio as information corresponding to the display area in the selected state. For example, the audio control unit 113 performs control so that "audio speed setting, audio speed, 3" is output by audio as information corresponding to the display area Acba, which is the display area in the selected state.

The detection unit 111 waits for a user operation (ACT 93). If the detection unit 111 does not detect a user operation (ACT 93, NO), the detection unit 111 continues the process of ACT 93. If the detection unit 111 detects a user operation (ACT 93, YES), the process transitions from ACT 93 to ACT 94. The detection unit 111 detects whether the user operation is a swipe operation (ACT 94). If the user operation is a swipe operation (ACT 94, YES), the process transitions from ACT 94 to ACT 95. If the user operation is not a swipe operation (ACT 94, NO), the process transitions from ACT 94 to ACT 97.

Based on the swipe operation, the display control unit 112 changes and displays the audio speed in the display area Acba without changing the display area in the selected state from the display area Acba (ACT 95). In ACT 95, for example, the display control unit 112 changes and displays the audio speed by 1 in the display area Acba for each swipe operation.

A downward swipe operation when the audio speed setting image Img is displayed on the touch screen 21 is explained as an example. The display control unit 112 reduces and displays the audio speed by 1 in the display area Acba based on the downward swipe operation. For example, in the audio speed setting image Img, it is assumed that the display area Acba displays the audio speed "5". The display control unit 112 displays "4", which is obtained by subtracting 1 from "5", as the audio speed in the display area Acba based on the downward swipe operation.

An upward swipe operation when the audio speed setting image Img is displayed on the touch screen 21 is explained as an example. The display control unit 112 increases and displays the audio speed by 1 in the display area Acba based on the upward swipe operation. For example, in the audio speed setting image Img, it is assumed that the display area Acba initially displays the audio speed "3". Based on the upward swipe operation, the display control unit 112 displays "4", which is incremented by one up from "3", as the audio speed in the display area Acba.

The audio control unit 113 performs control so that information corresponding to the display area in the selected state is output by audio based on the swipe operation (ACT 96). In ACT 96, for example, the audio control unit 113 performs control so that information corresponding to the display area in the selected state is output by audio if the audio speed is changed in the display area Acba based on the swipe operation. The audio control unit 113 performs control so that the audio speed is output by audio as information corresponding to the display area in the selected state. For example, it is assumed that the display area Acba displays "4", which is incremented by one from "3", as the audio speed based on the swipe operation. The display area Acba remains as the display area in the selected state before and after the swipe operation. In this example, the audio control unit 113 performs control so that "audio speed, 4" is output by audio as information corresponding to the display area Acba, which is the display area in the selected state.

The detection unit 111 detects whether the user operation is a double-tap operation (ACT 97). If the user operation is a double-tap operation (ACT 97, YES), the process transitions from ACT 97 to ACT 98. If the user operation is not a double-tap operation (ACT 97, NO), the process transitions from ACT 97 to ACT 101. If the user operation is not a double-tap operation, the user operation is assumed to be a tap operation (single tap operation).

The setting unit 114 sets the audio speed displayed in the display area Acba to the audio speed setting item based on the double-tap operation (ACT 98). For example, if the audio speed setting image Img is displayed on the touch screen 21 and the display area Acba displays the audio speed "2," the setting unit 114 sets "4" for the audio speed setting item based on the double-tap operation.

Based on the double-tap operation, the display control unit 112 displays the audio guidance setting image Imc on the touch screen 21 with the display area Acb as the display area in the selected state (ACT 99). For example, the display area Acb of the audio guidance setting image Imc displays the audio speed "4" set by the setting unit 114. The display area Acb updates and displays the audio speed as "4". Thus, the display area Acb can update and display the audio speed for each setting of the audio speed by the setting unit 114.

The audio control unit 113 performs control so that information corresponding to the display area in the selected state is output by audio based on the double-tap operation (ACT 100). In ACT 100, for example, the audio control unit 113 performs control so that information corresponding to the display area in the selected state of the audio guidance setting image Imc is output by audio as the audio guidance setting image Imc is displayed based on the double-tap operation. The audio control unit 113 performs control so that the audio speed setting item is output by audio as information corresponding to the display area in the selected state. The audio control unit 113 performs control so that the audio speed is output by audio as information corresponding to the display area in the selected state. If the display area Acb displays the audio speed "4", the audio control unit 113 performs control so that "audio guidance application setting, audio speed setting, setting value, 4" is output by audio as information corresponding to the display area Acb, which is the display area in the selected state. In this manner, the audio control unit 113 can perform control so that the set audio speed is output by audio as information corresponding to the display area in the selected state for each audio speed setting.

The audio control unit 113 performs control so that information corresponding to the display area in the selected state in the audio speed setting image Img is output by audio based on the tap operation (ACT 101). The process of ACT 101 may be similar to the process of ACT 20.

The processing for the volume associated with the user operation in the volume setting image Imh is the same as the processing for the audio speed described with reference to FIG. 15, and thus, the description thereof will be omitted. In the description with reference to FIG. 15, the display area Acb, the audio speed setting image Img, the display area Acba, and the audio speed can be read as the display area Acc, the volume setting image Imh, the display area Acca, and the volume, respectively.

Effects

In an embodiment, if a first image having a plurality of display areas including a display area related to the copy number setting item is displayed on the touch screen, the display control unit of the image forming apparatus changes and displays the display area in the selected state from the first display area to the second display area among the plurality of display areas based on the first user operation on the touch screen. If a second image having a display area for the number of copies set for the copy number setting item is displayed on the touch screen, the display control unit changes and displays the number of copies in the display area for the number of copies without changing the display area in the selected state from the display area for the number of copies based on the first user operation on the touch screen. The audio control unit of the image forming apparatus performs control so that information corresponding to the display area in the selected state is output by audio from the audio output device based on the operation on the touch screen.

Thus, the image forming apparatus can change the display area in the selected state based on the first operation and can change the number of copies based on the first operation. Thereby, the user can change the display area in the selected state and the number of copies by the same manner of operation on the touch screen. Since the operation for changing the display on the image displayed on the touch screen is the same operation mode regardless of the image, the image forming apparatus enables screen operation that does not rely on sight. Furthermore, the image forming apparatus can display the display area in the selected state or change and display the number of copies. As a result, a sighted user who supports a visually impaired user, or a partially sighted user who operates an image forming apparatus can easily visually grasp the operation status or setting status. Furthermore, the image forming apparatus can perform control so that information corresponding to the display area in the selected state is output by audio. Accordingly, the image forming apparatus can notify the user of the contents of the display area in the selected state by both displaying characters and outputting audio. Therefore, a sighted user or a partially sighted user can easily grasp the operation status or setting state by looking at the display of the display area in the selected state without relying only on audio.

In an embodiment, if the second image is displayed on the touch screen, the setting unit of the image forming apparatus sets the number of copies displayed in the display area for the number of copies for the copy number setting item based on the second user operation on the touch screen. If the second image is displayed on the touch screen, the display control unit displays the first image on the touch screen with the display area related to the copy number setting item as the display area in the selected state based on the second user operation.

Thus, the image forming apparatus can set the number of copies for the copy number setting item based on the second user operation and display the first image on the touch screen. Thereby, the user can set the number of copies and switch the image display by one user operation. Since operations for a plurality of processes are made common by one operation, the image forming apparatus enables screen operations that do not rely on sight.

In an embodiment, the display control unit displays the number of copies set for the copy number setting item in the display area related to the copy number setting item based on the second user operation. The audio control unit performs control so that the number of copies is output by audio as information corresponding to the display area in the selected state from the audio output device based on the second user operation.

In this way, the image forming apparatus can perform control so that the number of copies set based on the second user operation is output by audio. The user can check the number of copies by audio without requiring an additional user operation after the second user operation for setting the number of copies.

In an embodiment, the first user operation includes the third user operation and the fourth user operation. The first image displays a plurality of display areas arranged side by side in the first direction. If the first image is displayed on the touch screen, the display control unit changes and displays the display area in the selected state along the first direction from the first display area to the second display area adjacent to the first display area based on the third user operation. If the first image is displayed on the touch screen, the display control unit changes and displays the display area in the selected state along the second direction opposite to the first direction from the first display area to the second display area adjacent to the first display area based on the fourth user operation.

In this way, the image forming apparatus can change and display the display area in the selected state along different directions by the third user operation and the fourth user operation. This allows the user to sequentially change the display area in the selected state one by one along the first direction or the second direction. Since the display area in the selected state is changed one by one, the user can easily cause the display area in the selected state to reach the desired display area by repeating the user operation. Therefore, the image forming apparatus enables screen operations that do not rely on sight. Furthermore, the image forming apparatus can display a plurality of display areas arranged side by side in the first direction. As a result, the image forming apparatus can display a list of the plurality of display areas in a layout that allows a sighted user who supports a visually impaired user, or a partially sighted user who operates the image forming apparatus to visually and efficiently grasp the plurality of display areas.

In an embodiment, if the second image is displayed on the touch screen, the display control unit reduces and displays the number of copies by 1 in the display area for the number of copies based on the third user operation. If the second image is displayed on the touch screen, the display control unit increases and displays the number of copies by 1 in the display area for the number of copies based on the fourth user operation.

In this way, the image forming apparatus can decrease or increase and display the number of copies by the third user operation or the fourth user operation. This allows the user to sequentially change the number of copies one by one. Since the number of copies is sequentially changed one by one, the user can easily reach the desired number of copies by repeating the user operation. Therefore, the image forming apparatus enables screen operations that do not rely on sight.

In an embodiment, the third user operation is a swipe operation along the first direction from top to bottom. The fourth user operation is a swipe operation along the second direction from bottom to top.

This allows the user to sequentially change the display area in the selected state one by one in the same direction as the direction of the user operation on the touch screen. The user can sequentially change the number of copies by one in a direction intuitively corresponding to the direction of the user operation on the touch screen. For example, the user can sequentially change the number of copies by one in a decreasing direction, which intuitively corresponds to the direction from top to bottom. The user can sequentially change the number of copies by one in an increasing direction, which intuitively corresponds to the direction from bottom to top. Since the direction of the user operation corresponds to the moving direction of the display area in the selected state or the increase or decrease in the number of copies, the user can operate intuitively. Therefore, the image forming apparatus enables screen operations that do not rely on sight. Furthermore, the image forming apparatus can display a plurality of display areas arranged in a direction that matches the direction of the user operation for changing the display area in the selected state. Therefore, a sighted user supporting a visually impaired user, or a partially sighted user operating an image forming apparatus can more easily follow the display area in the selected state that moves in the same direction as the user operation direction. As a result, a sighted user or a partially sighted user can still easily grasp the operation status or setting state visually.

Other Embodiments

In an embodiment, the image forming apparatus 1 has been described as one example of an input device for inputting instructions based on user operations, but the embodiments are not limited thereto. The above-described example can be applied to various other device types for which inputting of an instruction to select one item from a plurality of items and inputting of an instruction to change the numerical value to be set for one item may be required. For example, the input device in another embodiment may be a POS terminal having at least one of product registration function or payment function. In some examples, the input device may be or incorporate a user terminal such as a smartphone or a tablet terminal or be a terminal such as a ticket vending machine.

A program may be stored in an electronic device according to an embodiment before the device is transferred to an end user or customer or the program may be transferred after the electronic device has already been transferred. In the latter case, the program may be transferred via a network or on a non-transitory, computer-readable recording medium. In general, the recording medium may have any form as long as the medium can store a program and is readable by a computer, like a CD-ROM, a memory card, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a controller configured to:
  display a first screen on a touch screen display, the first screen having a plurality of selectable options in a list, the plurality of selectable options including a first displayed option, the first displayed option being in a highlighted state when the first screen is initially displayed, and output audio data indicating the first displayed option is in the highlighted state,
  change from a currently selected one of the plurality of selectable options to a next one of the plurality of selectable options each time a first-type user operation gesture is received on the touch screen display displaying the first screen and output audio data indicating the next one of the plurality of selectable options is in the highlighted state, and
  receive a second-type user operation gesture on the touch screen display displaying the first screen to select the currently selected one of the plurality of selectable options in the highlighted display state to change a setting value associated with the currently selected one of the plurality of selectable options, and output audio data indicating the setting value.

2. The image forming apparatus according to claim 1, wherein the first-type user operation gesture is a swipe gesture and the second-type user operation gesture is a double-tap gesture.

3. The image forming apparatus according to claim 1, wherein the setting value is a number of copies value.

4. The image forming apparatus according to claim 1, further comprising:
a speaker configured to receive audio data and output sound according to the audio data.

5. The image forming apparatus according to claim 1, further comprising:
a sheet accommodation unit storing sheets to be printed;
a conveying unit for conveying sheets from the sheet accommodation unit for printing;
an image forming unit to form images on sheets conveyed by the conveying unit; and
a fixing device to fix images to the sheets conveyed by the conveying unit.

6. The image forming apparatus according to claim 1, further comprising:
a storage unit storing an audio guidance application which, when executed by the controller, causes the controller to display the first screen on the touch screen display.

7. An image forming apparatus, comprising:
a touch screen display to display information to a user and receive user inputs;
a printer unit configured to print images on sheets; and
a controller configured to:
  control the printer unit to print images on sheets according to printer setting values;
  display a first screen on the touch screen display, the first screen having a plurality of selectable options in a list, the plurality of selectable options including a first displayed option, the first displayed option being in a highlighted state when the first screen is initially displayed, and output audio data indicating the first displayed option is in the highlighted state,
  change from a currently selected one of the plurality of selectable options to a next one of the plurality of selectable options each time a first-type user operation gesture is received on the touch screen display displaying the first screen and output audio data indicating the next one of the plurality of selectable options is in the highlighted state, and
  receive a second-type user operation gesture on the touch screen display displaying the first screen to select the currently selected one of the plurality of selectable options in the highlighted display state to change a setting value associated with the currently selected one of the plurality of selectable options, and output audio data indicating the setting value.

8. The image forming apparatus according to claim 7, wherein the first-type user operation gesture is a swipe gesture and the second-type user operation gesture is a double-tap gesture.

9. The image forming apparatus according to claim 7, wherein the setting value is a number of copies value.

10. The image forming apparatus according to claim 7, further comprising:
a speaker configured to receive audio data and output sound according to the audio data.

11. The image forming apparatus according to claim 7, wherein the printer unit includes:
a sheet accommodation unit storing sheets to be printed;
a conveying unit for conveying sheets from the sheet accommodation unit for printing;
an image forming unit to form images on sheets conveyed by the conveying unit; and
a fixing device to fix images to the sheets conveyed by the conveying unit.

12. The image forming apparatus according to claim 7, further comprising:
a storage unit storing an audio guidance application which, when executed by the controller, causes the controller to display the first screen on the touch screen display.

13. The image forming apparatus according to claim 7, wherein the controller comprises a central processing unit and a memory unit.

14. A user input device, comprising:
a processor configured to:
control a touch screen display to display a first screen, the first screen having a plurality of selectable options in a list, the plurality of selectable options including a first displayed option, the first displayed option being in a highlighted state when the first screen is initially displayed, and control an audio output unit to output audio data indicating the first displayed option is in the highlighted state,
change from a currently selected one of the plurality of selectable options to a next one of the plurality of selectable options each time a first-type user operation gesture notice is received from the touch screen display displaying the first screen and control the audio output unit to output audio data indicating the next one of the plurality of selectable options is in the highlighted state, and
receive a second-type user operation gesture notice from the touch screen display displaying the first screen to select the currently selected one of the plurality of selectable options in the highlighted display state to change a numerical value associated with the currently selected one of the plurality of selectable options, and control the audio output unit to output audio data indicating the numerical value.

15. The user input device according to claim 14, wherein the first-type user operation gesture notice corresponds to a swipe gesture and the second-type user operation gesture notice corresponds to a double-tap gesture.

16. The user input device according to claim 14, wherein the numerical value is a number of copies value.

17. The user input device according to claim 14, further comprising:
a speaker configured to receive audio data from the audio control unit and output sound according to the audio data.

18. The user input device according to claim 14, further comprising:
a sheet accommodation unit storing sheets to be printed;
a conveying unit for conveying sheets from the sheet accommodation unit for printing;
an image forming unit to form images on sheets conveyed by the conveying unit; and
a fixing device to fix images to the sheets conveyed by the conveying unit.

19. The user input device according to claim 14, further comprising:
a storage unit storing an audio guidance application which, when executed by the processor, causes the processor to control the touch screen display to display the first screen.

* * * * *